(12) United States Patent
Rakib et al.

(10) Patent No.: US 8,549,556 B2
(45) Date of Patent: Oct. 1, 2013

(54) CONTEXTUAL ADVERTISING

(76) Inventors: Shlomo Selim Rakib, Cupertino, CA (US); Gilles Bruno Marie Devictor, Milpitas, CA (US)

(*) Notice: Subject to any disclaimer, the term of this patent is extended or adjusted under 35 U.S.C. 154(b) by 373 days.

(21) Appl. No.: 12/350,869

(22) Filed: Jan. 8, 2009

(65) Prior Publication Data

US 2010/0005488 A1     Jan. 7, 2010

Related U.S. Application Data

(60) Provisional application No. 61/045,278, filed on Apr. 15, 2008.

(51) Int. Cl.
*H04N 7/10* (2006.01)
*H04N 7/025* (2006.01)
*H04N 7/173* (2011.01)
*H04N 9/80* (2006.01)

(52) U.S. Cl.
USPC .................. 725/34; 725/32; 725/33; 725/35; 725/36; 725/86; 725/87; 725/88; 725/102; 386/249

(58) Field of Classification Search
USPC .............. 725/9, 32–36, 86–88, 102; 386/249
See application file for complete search history.

(56) References Cited

U.S. PATENT DOCUMENTS

| | | | | |
|---|---|---|---|---|
| 6,282,713 | B1 * | 8/2001 | Kitsukawa et al. | 725/36 |
| 7,200,853 | B2 * | 4/2007 | Kawai | 725/34 |
| 2004/0230994 | A1 * | 11/2004 | Urdang et al. | 725/88 |
| 2008/0201734 | A1 * | 8/2008 | Lyon et al. | 725/34 |

* cited by examiner

*Primary Examiner* — Pankaj Kumar
*Assistant Examiner* — Alazar Tilahun
(74) *Attorney, Agent, or Firm* — Stephen E. Zweig

(57) ABSTRACT

A contextual advertising system and method receives video data and multiple advertisements associated with the video data. The system and method identify object content in the received video data and generates a video signal representing the video data. The video signal is communicated to a display device which displays a video image. User interaction with the displayed video image is monitored by the system and method. An advertisement is selected from the multiple received advertisements for display to the user. The advertisement is selected based on the user interaction with the displayed video image and the identified object content in the video data.

24 Claims, 30 Drawing Sheets

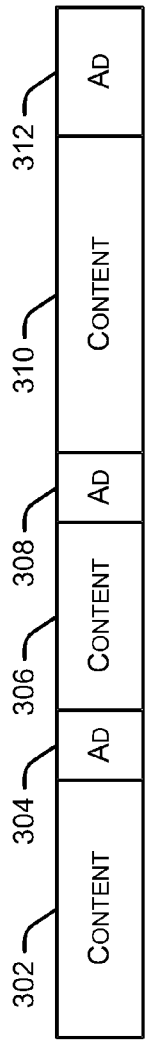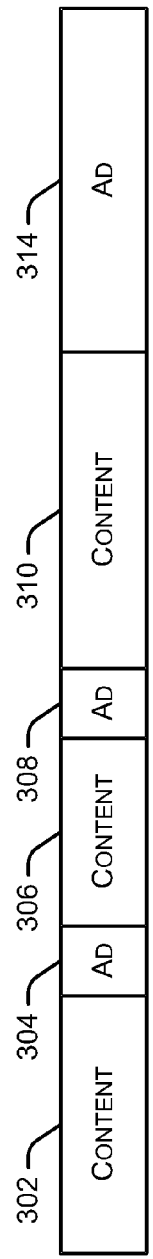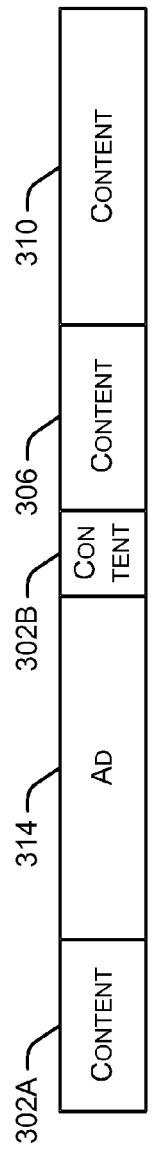

FIG. 16
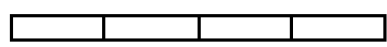
1620
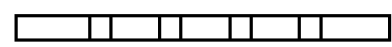
1622
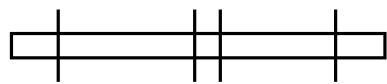
1624
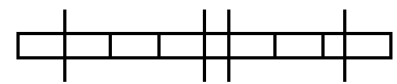
1626

CONTEXTUAL ADVERTISING

RELATED APPLICATIONS

This application claims the priority benefit of U.S. provisional patent application 61/045,278, "Video Genomics: a framework for representation and matching of video content", filed Apr. 15, 2008, the disclosure of which is incorporated by reference herein.

BACKGROUND

The invention relates generally to systems and methods for selecting and presenting advertisements to one or more users. In particular, the described systems and methods select advertisements for a specific user based on content contained in video data being viewed by the user as well as the user's interaction with the viewed video data.

Traditional advertising in video programs, such as broadcast television programs, provides several advertisements placed before, during and after the program content. Typically, each viewer of the program views the same advertisements positioned at the same location with respect to the program content. Although traditional advertisements may attempt to align with the interests of an "average" viewer, these types of advertisements are not targeted to specific viewers or the real-time interests of the viewers. Instead, these traditional advertisements are intended for a general viewing audience.

Traditional advertisements in video programs that are intended for an "average" viewer are typically less effective because many viewers have no interest in the content of the advertisement. Additionally, viewers' interests may change from one day to the next, such that an advertisement which is effective for a particular viewer on one day may not be effective for that same viewer on another day. Thus, traditional advertisements in video programs have limited effectiveness in converting viewers into customers of the product or service advertised.

BRIEF DESCRIPTION OF THE DRAWINGS

FIGS. 3A-3C show embodiments of a video program with varying content and advertisement placement.

FIG. 16 shows an example of dividing a video sequence into temporal intervals.

Throughout the description, similar reference numbers may be used to identify similar elements.

DETAILED DESCRIPTION

The systems and methods described herein select and present advertisements to users viewing displayed video data. The described systems and methods receive advertisement data associated with the video data and select advertisements for users based on identified content within the video data and user interaction with the video data. These systems and methods provide contextual advertisements to users viewing the displayed video data which are more likely to be of interest to the user due to the selection of advertisements based on real-time user interest. Contextual advertisements are generally more effective in converting viewers into customers of the product or service advertised. The systems and methods described herein obtain the context from the actual video images being viewed by a user.

Figure 1:
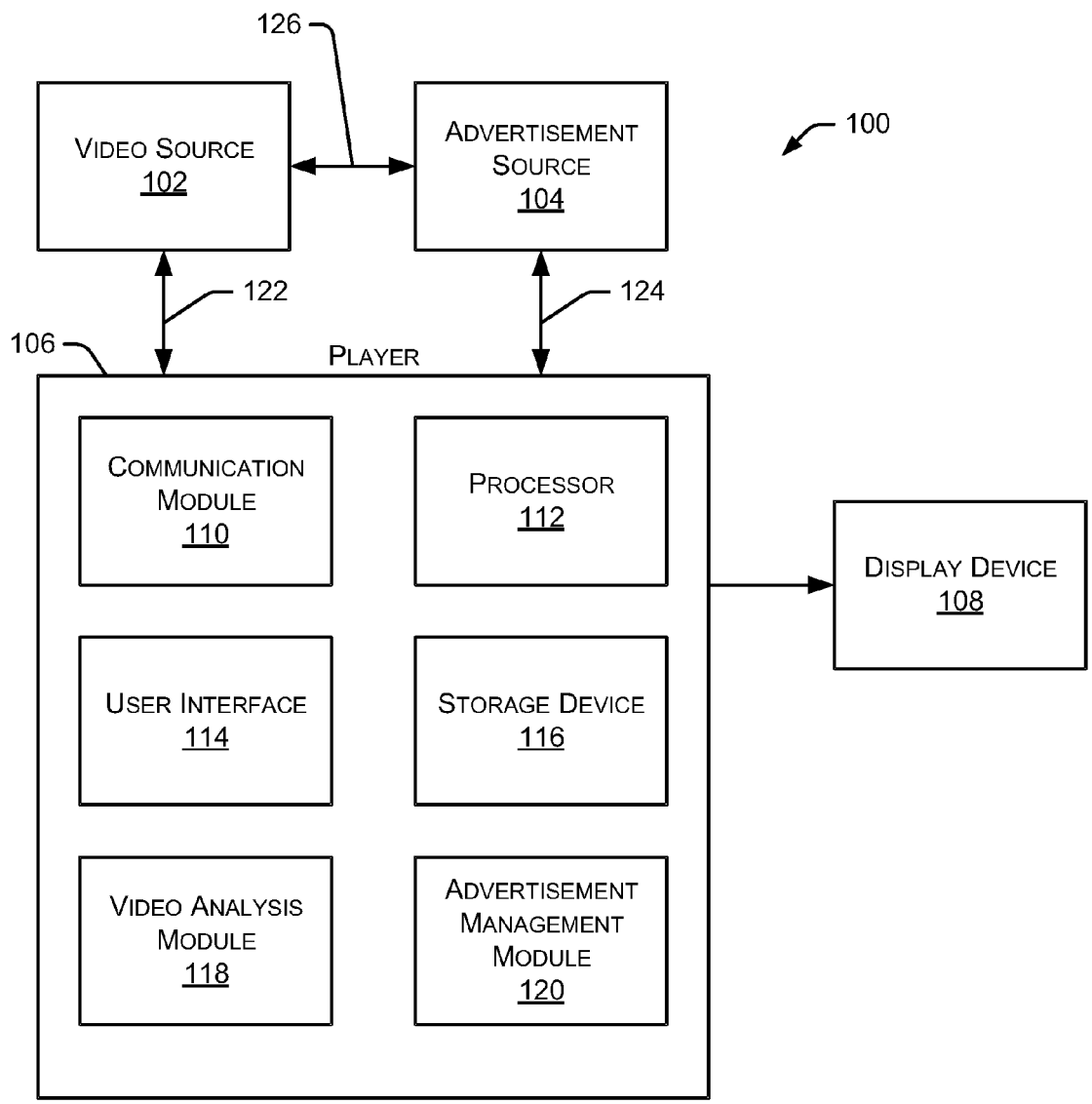
FIG. 1 shows an example system capable of implementing contextual advertising.

FIG. 1 shows an example system 100 capable of implementing contextual advertising as described herein. System 100 includes a video source 102 and an advertisement source 104 coupled to a player 106. Video source 102 is any system capable of communicating video data to player 106. Video source 102 may be located remotely from player 106 or may be local to player 106. Example video sources 102 include video broadcast systems, video data service providers, video servers, DVD players and the like. Video data is communicated from video source 102 to player 106 via a communication link 122 using any communication medium and any communication protocol. Advertisement source 104 is any system capable of communicating advertisement data to player 106. Example advertisement sources 104 include servers, broadcast systems and the like. Advertisement data is communicated from advertisement source 104 to player 106 using any communication medium and any communication protocol. Advertisement data is communicated from advertisement source 104 to player 106 via a communication link 124 using any communication medium and any communication protocol. Additionally, advertisement data may be communicated from advertisement source 104 to video source 102 via a communication link 126 using any communication medium and any communication protocol.

In a particular embodiment, advertisement source 104 is contained within video source 102. In another embodiment, advertisement source 104 is coupled to video source 102 such that advertisement data is communicated from advertisement source 104 to video source 102. In these embodiments, the advertisement data is communicated to player 106 by video source 102. The advertisement data may be communicated at the same time as the video data or at a different time. For example, the advertisement data can be sent along with the video data using a separate sub-channel of a video broadcast. In another example, the advertisement data is sent to player 106 and stored by player 106 for future display. In this example, the advertisement data is sent at night or during times when player 106 is not receiving video data.

Player 106 is capable of receiving video data from video source 102 and advertisement data from advertisement source 104. Player 106 generates an output video signal that is communicated to a display device 108, which displays video images based on the output video signal. Display device 108 can be a monitor, television, projector, or any other device capable of displaying video images.

Player 106 includes a communication module 110, a processor 112, a user interface 114, a storage device 116, a video analysis module 118 and an advertisement management module 120. Communication module 110 communicates data and other information between player 106 and other devices, such as video source 102, advertisement source 104, and so forth. Processor 112 performs various operations necessary during the operation of player 106. For example, processor 112 is capable of performing several methods and procedures discussed herein to process video data and advertisement data. User interface 114 allows a user to interact with player 106. This user interaction may occur via remote control, voice commands, pointing device such as a mouse, or any other method of interaction. Storage device 116 stores data and other information used during the operation of player 106. Storage device 116 may include one or more volatile and/or non-volatile memories. In a particular embodiment, storage device 116 is a hard disk drive combined with volatile and non-volatile memory devices. Video analysis module 118 performs various video processing as discussed herein. For example, video analysis module 118 is capable of identifying content contained within the video data being displayed. Advertisement management module 120 performs various advertisement-related procedures, as discussed herein. For example, advertisement management module 120 is capable of selecting among multiple advertisements for display to a user based on various factors.

Figure 2:
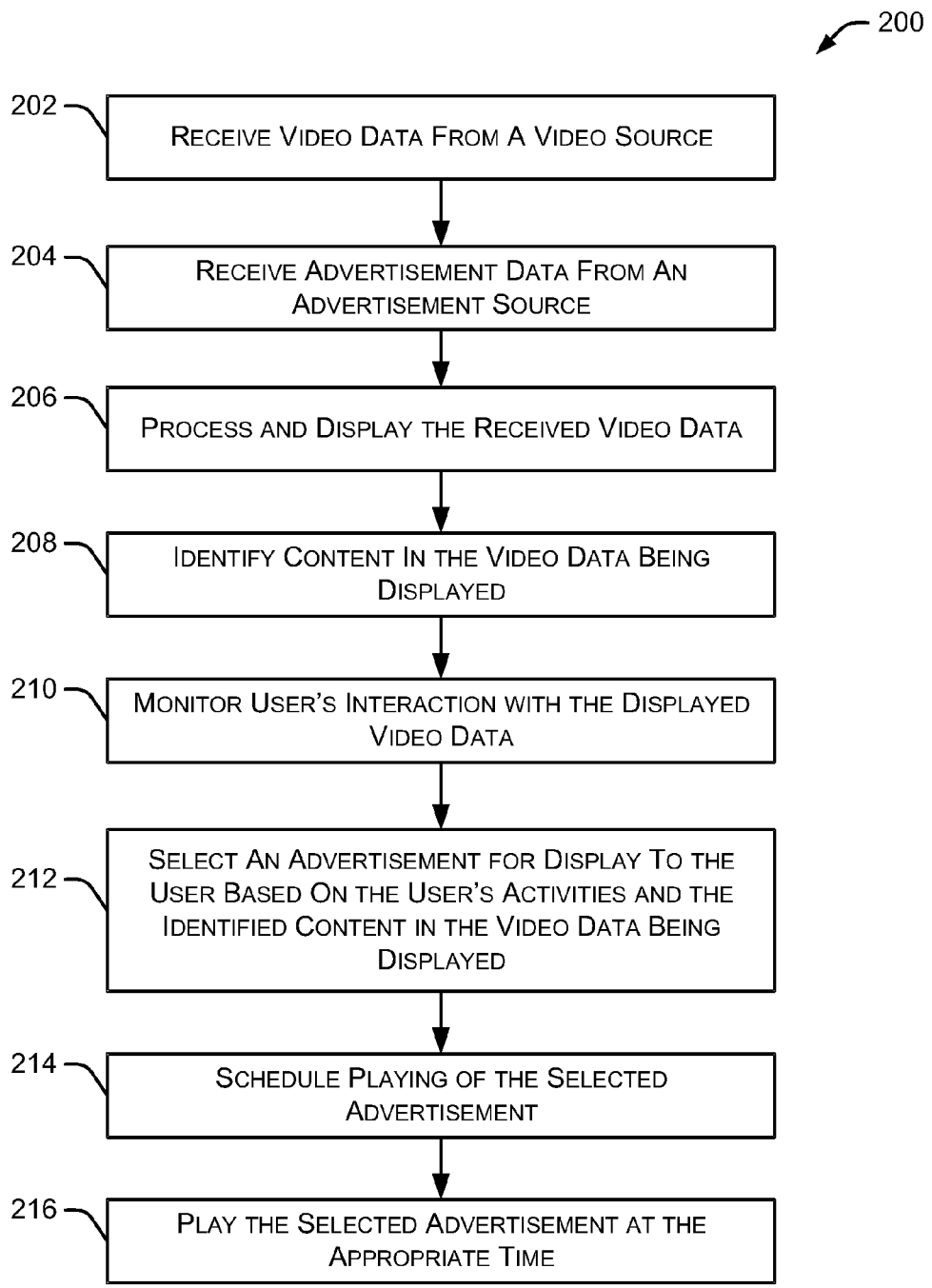
FIG. 2 is a flow diagram showing an embodiment of a procedure for presenting advertisements to a user.

Video analysis module 118 and advertisement management module 120 are shown in FIG. 2 as separate modules. In alternate embodiments, these two modules may be combined in a single module. In other embodiments, one or both of these modules represent computer-readable instructions that are executed, for example, by processor 112. In a particular embodiment, the components and functionality of player 106 are incorporated into another device, such as a set top box, satellite receiver, DVD player, Blu-ray Disc™ player, digital video recorder, game console and the like.

FIG. 2 is a flow diagram showing an embodiment of a procedure 200 for presenting advertisements to a user. Initially, video data is received from a video source (block 202), such as video source 102 shown in FIG. 1. Example video data may be contained in a broadcast signal, contained in data streamed across a network, or contained in any other data communication method. The video data may include, for example, television programs, movies, concerts, and other content that includes a video component. Procedure 200 continues by receiving advertisement data from an advertisement source (block 204). As discussed above, the advertisement data may be sent along with the video data or may be sent on a separate communication link and/or at a separate time. In one embodiment, the advertisement data is broadcast or pushed from the advertisement source to the player. In other embodiments, the advertisement data is pulled, streamed, or downloaded from the advertisement source by the player.

The player (e.g., player 106 in FIG. 1) then processes and displays the received video data (block 206). For example, the player generates a video signal representing the video data and provides the video signal to a display device that displays a series of video images contained in the video signal. Procedure 200 continues by identifying content in the video data being displayed (block 208). The identified content includes, for example, actors/actresses appearing in a particular scene, a car appearing in an image, or a beverage being consumed by an actor in the scene. This content may be identified using various methods, as discussed in greater detail below.

The procedure of FIG. 2 continues by monitoring the user's interaction with the displayed video data (block 210). The user is able to interact with the displayed video data using, for example, a remote control device that communicates user commands and user input to the player. These commands and user input are monitored and stored for future reference. Example user commands include selecting a particular object or person in the displayed video data. Other example user commands include pausing, fast forwarding, rewinding, zooming, or activating a slow-motion display of the video data. Next, procedure 200 selects an advertisement for display to the user based on the user's activities and the identified content in the video data being displayed (block 212). As discussed herein, by evaluating user commands and content contained within the video data, the described systems and methods select advertisements likely to be of interest to the user.

A variety of algorithms are useful for selecting an advertisement. For example, an advertisement associated with the last object selected by the user may be chosen for that particular user. Alternatively, advertisers may bid on advertisements (e.g., the amount the advertiser is willing to pay for display of a particular advertisement), in which case the relevant advertisement with the highest bid is selected for display to the user. Another embodiment selects an advertisement based on the user's history of selecting objects in the video data. For example, if the user has selected a particular actor more frequently than other objects in the video data, an advertisement related to that actor (such as an upcoming movie starring that actor) is selected for display to the user.

In another embodiment, an advertisement is selected based on prior purchases made by the user after selecting objects in the video data. For example, if the user has previously purchased jewelry after selecting a jewelry object in the video data, then a jewelry-related advertisement may be selected for this user. Other embodiments select an advertisement to display to the user based on a weighting of multiple factors, such as the factors discussed herein. For example, a weighting process may consider objects selected by the user, bid prices associated with advertisements, prior purchases made by the user, repeated viewing of portions of the video data containing specific objects, and the like.

Procedure 200 continues by scheduling the playing of the selected advertisement (block 214). For example, the selected advertisement may be displayed to the user immediately or may be scheduled for the next commercial segment of the program contained in the video data. The selected advertisement is then played at the appropriate time (block 216).

FIGS. 3A-3C show embodiments of a video program with varying content and advertisement placement. All three embodiments of the video program provide the same content, identified by reference numerals 302, 306 and 310. Content 302 is referred to as the first content segment, content 306 is referred to as the second content segment, and content 310 is referred to as the third content segment. The number of advertisement segments, the positioning of the advertisement segments, and the length of the advertisement segments varies among the three figures.

FIG. 3A illustrates a "traditional" ordering of the content and advertisement segments of a video program, such as a television program. This program begins with a first content segment 302, followed by a first advertisement segment 304, another content segment 306, another advertisement segment 308, a third content segment 310, and a third advertisement segment 312. In existing systems, each viewer receives the same content segments and the same advertisement segments in the same order, i.e., the ordering shown in FIG. 3A. Existing systems do not typically vary advertisements, advertisement length, or advertisement positioning from one user to another. However, the systems and methods discussed herein provide for varying advertisement and content placement, varying advertisement length, and varying advertisements for a particular user based on one or more factors.

As mentioned above with respect to FIG. 2, advertisements presented to a user may vary based on the user's interaction with the displayed video data and the identified content in the video data. In the embodiment of FIG. 3A, a particular user may identify a particular wristwatch worn by an actor in a scene in the first content segment 302. In this example, the first advertisement segment 304 is selected to include an advertisement for the brand of wristwatch identified by the user. Alternatively, the first advertisement segment may include an advertisement for a similar brand of wristwatch or a store that sells the particular brand of wristwatch. Thus, the particular advertisement displayed in advertisement segment 304 can vary among different users based on the user's interaction with the video data and the identified content in the video data. Such targeted advertising is generally more effective since it has a greater likelihood of being interesting to the user.

FIG. 3B illustrates an alternate ordering of the content and advertisement segments of the video program discussed above with respect to FIG. 3A. The content segments of FIG. 3B (content 302, 306, and 310) are the same as the content segments shown in FIG. 3A. Similarly, advertisement segments 304 and 308 are the same as FIG. 3A. However, a final advertisement segment 314 in FIG. 3B has a longer length than the final advertisement segment 312 in FIG. 3A. As discussed in greater detail below, the longer final advertisement segment 314 may be a detailed advertisement specifically requested by the user (e.g., a detailed advertisement for a product of interest to the user). The user may have indicated an interest in a particular product or service during an earlier content segment or advertisement segment, and requested to watch a detailed advertisement for the product or service at the end of the program content. Thus, the "traditional" (or default) final advertisement segment 312 is replaced with the detailed advertisement 314 requested by the user. For example, the user may have expressed an interest in a car driven by one of the actors in the first content segment 302. When the user expressed an interest in the car, the user was given an opportunity to watch a detailed advertisement 314 related to the car of interest at the end of the program content (i.e., after content segment 310). In a particular example, the final advertisement segment 314 is an "infomercial type advertisement", a tutorial, or other example of how to use a particular product or service. Alternatively, the final advertisement segment may be a movie trailer or an interview with a movie director.

FIG. 3C illustrates another ordering of the content and advertisement segments of the video program discussed above. The content segments of FIG. 3C (content 302, 306, and 310) are the same as the content segments shown in FIGS. 3A and 3B. However, the embodiment of FIG. 3C contains a single advertisement segment 314, which is the same as the final advertisement segment shown in FIG. 3B. In this example, the user expressed an interest in a car driven by one of the actors in the first content segment 302. When the user expressed an interest in the car, the user was given an opportunity to watch a detailed advertisement 314 related to the car of interest. The user chose to watch the detailed advertisement 314 at that time, rather than waiting until the end of the program content. Since the user watched the detailed advertisement 314 immediately, the remainder of the advertisement segments were eliminated. Thus, the embodiment of FIG. 3C begins playing content segment 302, but stops playing that content segment when the user requests detailed advertisement 314. After playing detailed advertisement 314, playback of content 302 continues followed by content segments 306 and 310, with no additional advertisements. As shown in FIG. 3C, content segment 302 is separated into two sub-segments: 302A (played before detailed advertisement 314) and 302B (played after detailed advertisement 314). In this example, the user is "rewarded" for immediately viewing the detailed advertisement 314 by not having to view any other advertisements in the program.

As discussed above with respect to FIG. 2, various systems and methods are available to identify content within the video data being displayed. For example, video data can be communicated with associated metadata, such as metadata that associates objects with the video data timeline, a title associated with the video data, actors appearing in the video data, and the like. In another embodiment, a hypervideo system (also referred to as hyperlinked video) is used which allows the association of objects in the video data with an action. When the video data is broadcast to users, an associated video broadcast guide is used to identify information associated with the video data. This identified information is then used to retrieve a video timeline and objects associated to that timeline using, for example, the Video DNA system and method described herein.

Figure 4:
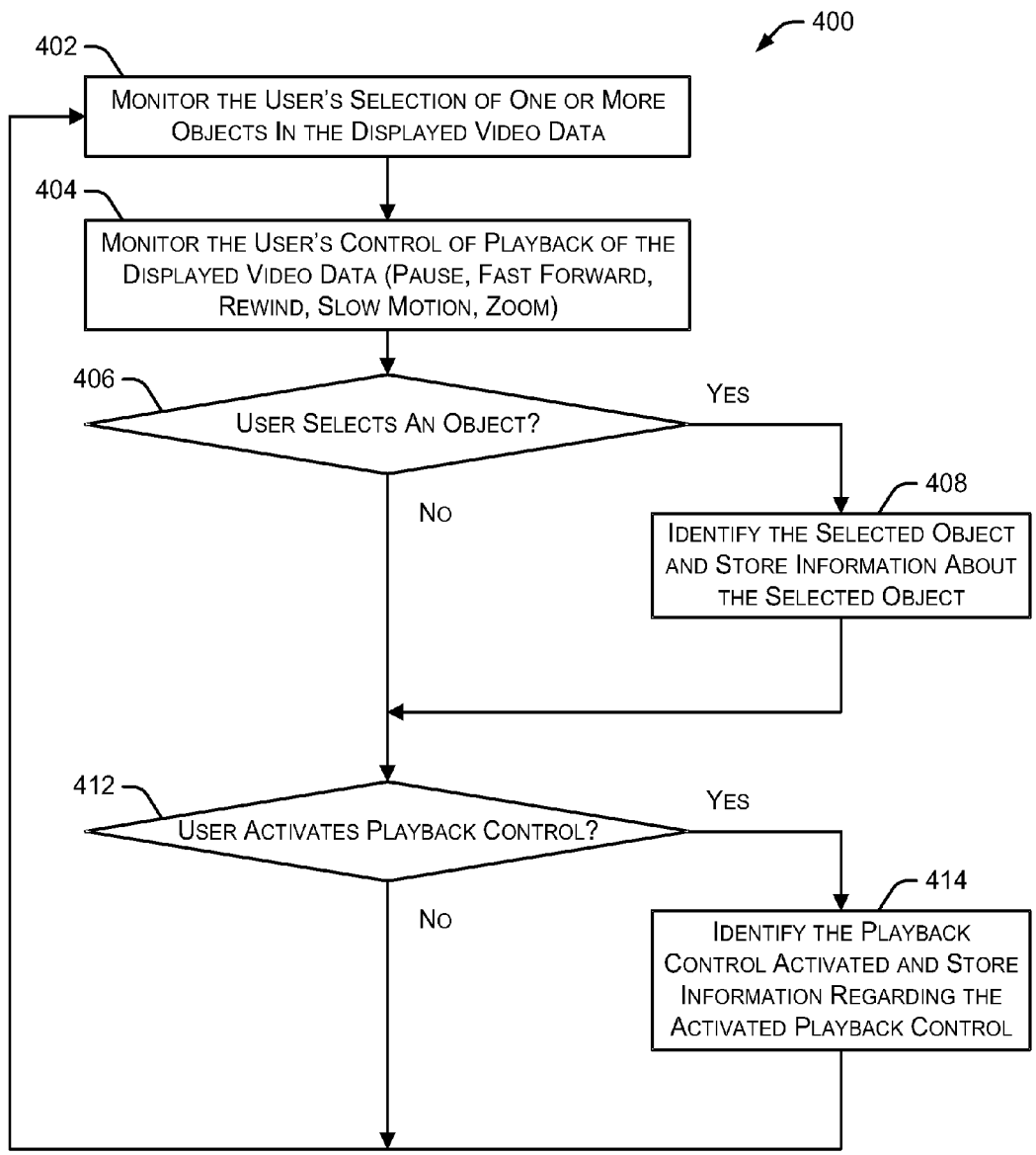
FIG. 4 is a flow diagram showing an embodiment of a procedure for monitoring a user's interaction with the displayed video data.

FIG. 4 is a flow diagram showing an embodiment of a procedure 400 for monitoring a user's interaction with the displayed video data. The procedure monitors the user's selection of one or more objects in the displayed video data (block 402). As discussed herein, an object can be any person, place, or item displayed in a particular scene represented by the video data. The user may select an object (such as an actor, a particular car, or a sculpture) displayed in the scene and request additional information about that object. Procedure 400 also monitors the user's control of playback of the displayed video data (block 404). As discussed herein, playback control includes, for example, pausing, fast-forwarding, rewinding, slowing (slow motion) and zooming the displayed video data. Use of these playback controls may indicate a user's interest in the content contained in the associated video data.

Procedure 400 continues by determining whether the user has selected an object (block 406). If an object is selected by the user, the procedure identifies the selected object and stores information about the selected object (block 408). The information about the selected object may include the identity of the selected object as well as the time at which the object was identified (e.g., the time stamp within the video data being displayed to the user). The stored information about the selected object is used for future processing, such as advertisement selection and/or advertisement prioritization.

If the user has not selected an object at block 406, the procedure continues by determining whether the user has activated a playback control (block 412). If a playback control is activated by the user, the procedure identifies the playback control activated (block 414) and stores information regarding the activated playback control (block 416). The information regarding the activated playback control may include the specific playback control activated (e.g., pause, fast forward, rewind, zoom, or slow motion) as well as the time at which the playback control was activated (e.g., the time stamp within the video data being displayed to the user). Additionally, the stored information can include information regarding the content contained in the displayed video data at the time the playback control was activated. In the case of fast forward or rewind operations, the stored information can include all content contained in the displayed video data over the time period associated with the fast forward or rewind operation. The stored information regarding the activated playback control is used for future processing, such as advertisement selection and/or advertisement prioritization.

Figure 5:
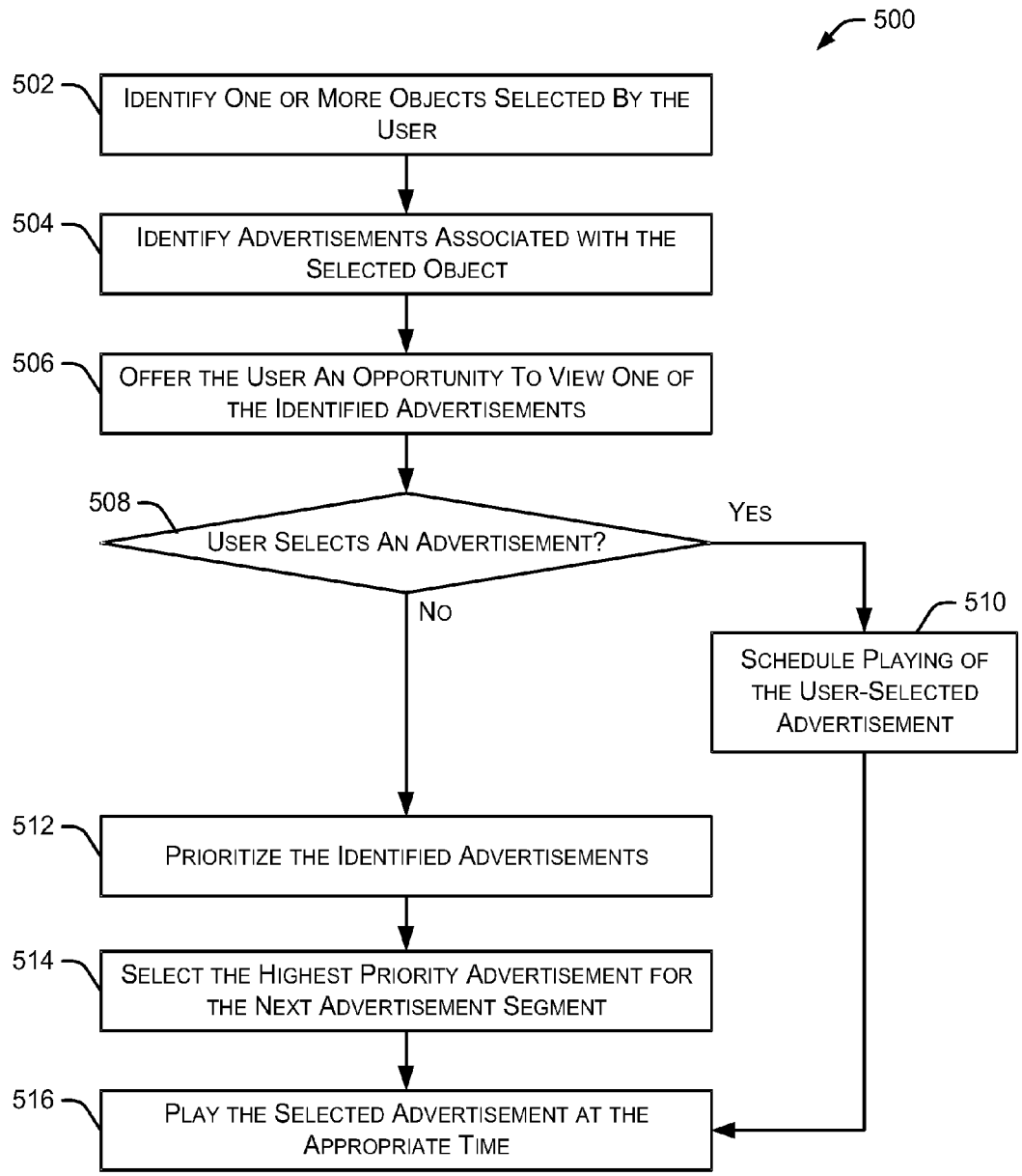
FIG. 5 is a flow diagram showing an embodiment of a procedure for selecting an advertisement for a user.

FIG. 5 is a flow diagram showing an embodiment of a procedure 500 for selecting an advertisement for a user. The procedure of FIG. 5 is used to select an advertisement after a user has selected a particular object in a video scene. Initially, procedure 500 identifies one or more objects selected by the user (block 502). Information regarding the selected objects may be stored, for example, in a storage device contained in a player. Next, the procedure identifies one or more advertisements associated with the selected object(s) (block 504). These advertisements can be retrieved from an advertisement source in response to the user's selection of an object or the advertisements may have been previously downloaded and stored in the player.

After identifying one or more advertisements, the user is offered an opportunity to view one or more of the identified advertisements (block 506). For example, if the user has selected a car object in a scene, the user is offered an opportunity to view a detailed advertisement providing information about that specific car. The "offer" may be presented as a dialog box, a selectable icon, or other identifier in the current scene, such as a dialog box that states "Click here to learn more about this car". In particular embodiments, the user may be presented with multiple advertisement options, such as a brief overview of the car's features or an in-depth description and performance review of the car. In a particular implementation, playback of video content is temporarily paused to allow the user to respond to the offer without missing any of the video content.

Procedure 500 continues by determining whether the user has selected one of the offered advertisements (block 508). If the user has selected an advertisement, block 510 schedules playing of the user-selected advertisement. In addition to selecting a particular advertisement, the user may also select whether to watch the advertisement immediately (thereby pausing playback of the current content), watch the advertisement at the next scheduled advertisement break, or watch the advertisement at the end of the regular content. After scheduling the selected advertisement for playback, the procedure continues to block 516, which plays the selected advertisement at the appropriate time.

If, at block 508, procedure 500 determines that the user has not selected one of the offered advertisements, the procedure makes the advertisement selection. This advertisement selection is performed by prioritizing the multiple identified advertisements (block 512). If only one advertisement was identified at block 504, then the prioritization of the advertisements (block 512) is not necessary. Procedure 500 then selects the highest priority advertisement for the next advertisement segment (block 514). In the example of FIG. 3A, if a user selects an object during content segment 306, the next advertisement segment is segment 308. Procedure 500 then plays the selected advertisement at the appropriate time (block 516), such as the next advertisement segment.

Figure 6:
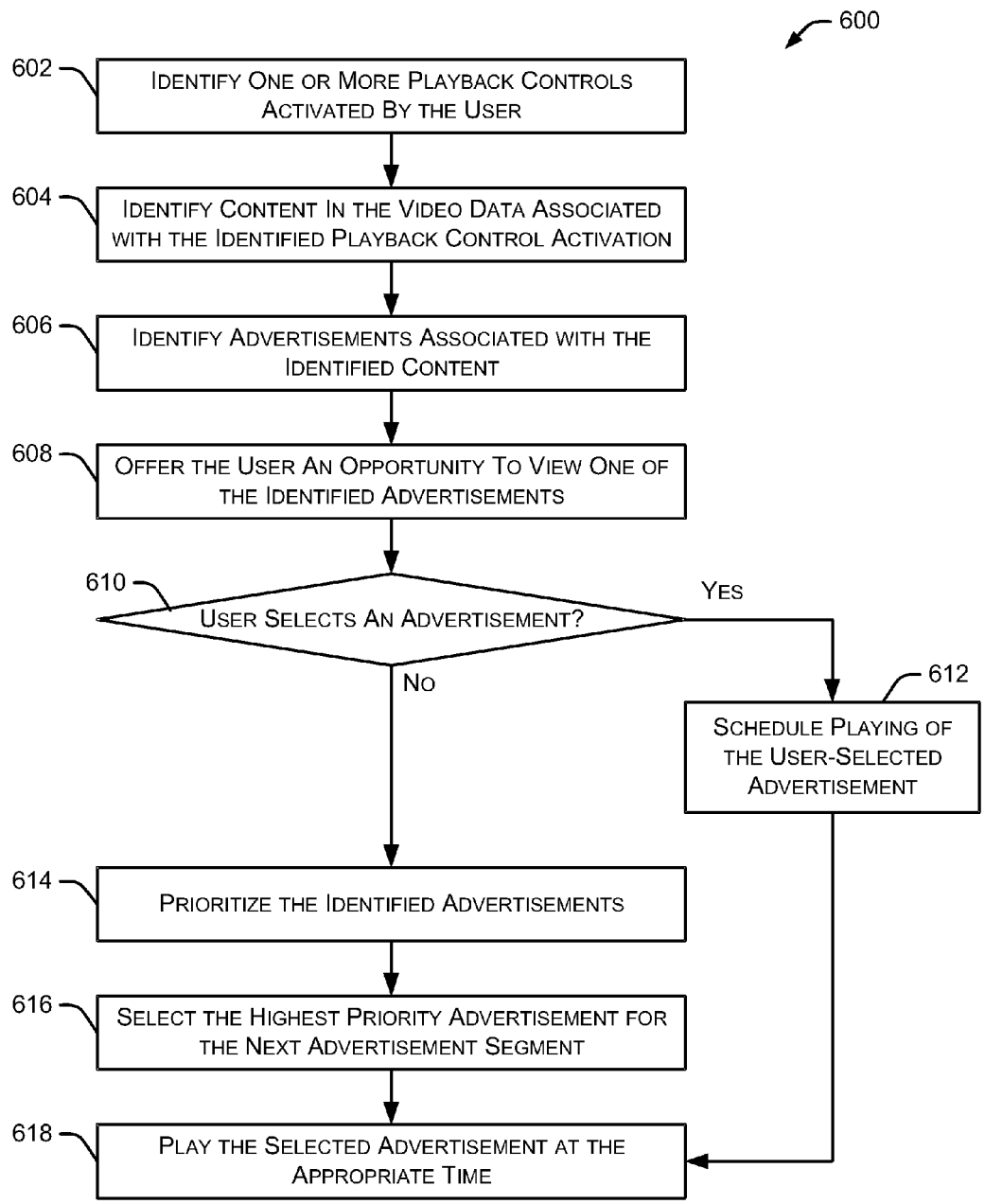
FIG. 6 is a flow diagram showing another embodiment of a procedure for selecting an advertisement for a user.

FIG. 6 is a flow diagram showing another embodiment of a procedure 600 for selecting an advertisement for a user. The procedure of FIG. 6 is used to select an advertisement after a user has activated a playback control feature in the displayed video data. Initially, procedure 600 identifies one or more playback controls selected by the user (block 602). Information regarding the selected playback controls can be stored, for example, in a storage device contained in a player. Next, the procedure identifies content in the video data associated with the identified playback control activation (block 604). This identified content may include one or more people, items, or other content displayed in the scene images.

Procedure 600 continues by identifying one or more advertisements associated with the identified content (block 606). The user is then offered an opportunity to view one or more of the identified advertisements (block 608). For example, if a particular actor is included in the identified content, the user is offered an opportunity to view more information about that actor, such as the actor's background and other programs or movies in which the actor appears. The "offer" may be presented as a dialog box, a selectable icon, or other identifier in the current scene, such as a dialog box that states "Click here to learn more about John Doe". In particular embodiments, the user may be presented with multiple advertisement options, such as a brief background on the actor or an opportunity to watch a trailer for an upcoming movie starring the actor. In a particular implementation, playback of video content is temporarily paused to allow the user to respond to the offer without missing any of the video content.

Procedure 600 continues by determining whether the user has selected one of the offered advertisements (block 610). If the user has selected an advertisement, block 612 schedules playing of the user-selected advertisement. In addition to selecting a particular advertisement, the user may also select whether to watch the advertisement immediately (thereby pausing playback of the current content), watch the advertisement at the next scheduled advertisement break, or watch the advertisement at the end of the regular content. After scheduling the selected advertisement for playback, the procedure continues to block 618, which plays the selected advertisement at the appropriate time.

If, at block 610, procedure 600 determines that the user has not selected one of the offered advertisements, the procedure makes the advertisement selection. This advertisement selection is performed by prioritizing the multiple identified advertisements (block 614). If only one advertisement was identified at block 606, then the prioritization of the advertisements (block 614) is not necessary. Procedure 600 then selects the highest priority advertisement for the next advertisement segment (block 616). In the example of FIG. 3A, if a user selects an object during content segment 302, the next advertisement segment is segment 304. Procedure 600 then plays the selected advertisement at the appropriate time (block 618), such as the next advertisement segment. In an alternate embodiment, if the user does not select an advertisement, procedure 600 selects a default advertisement for playing to the user.

Figure 7:
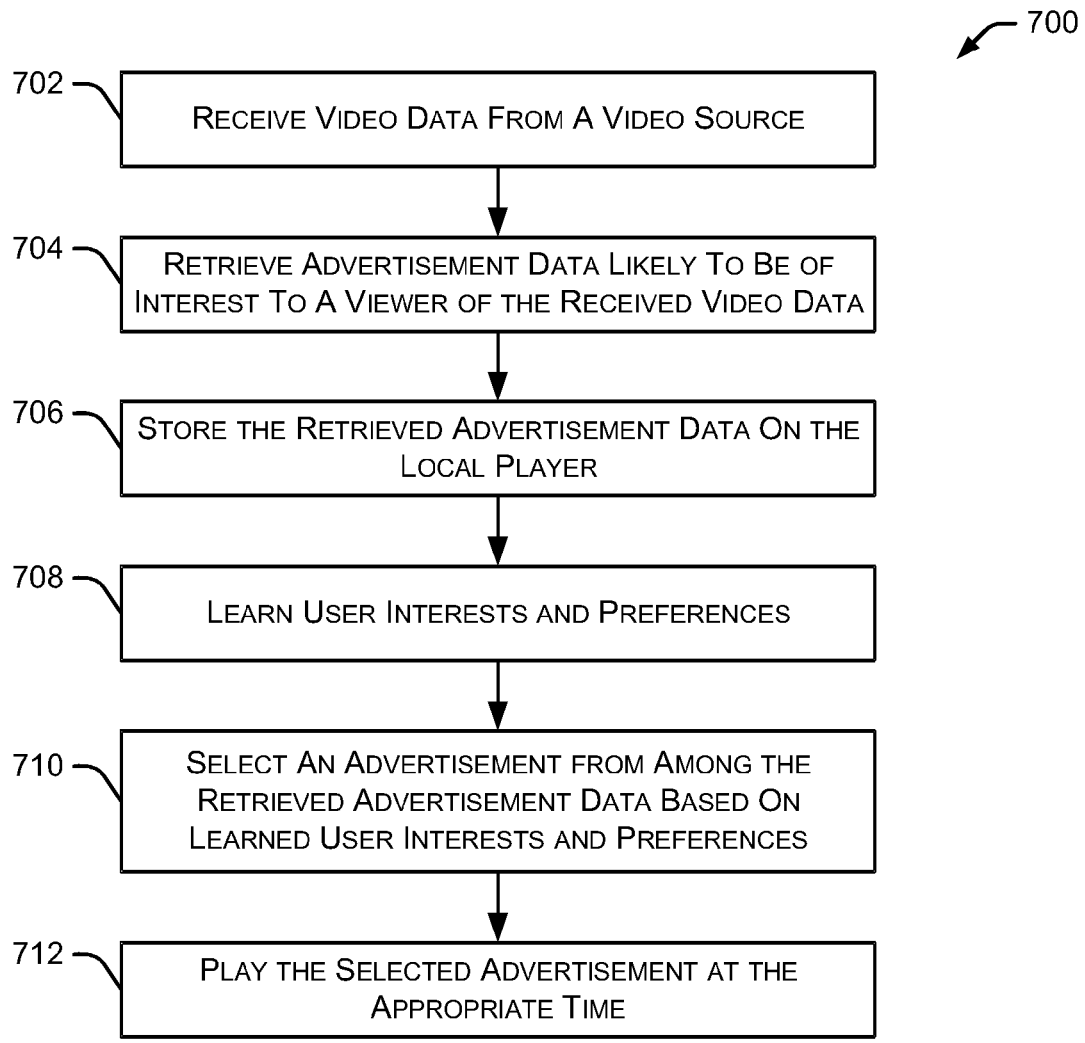
FIG. 7 is a flow diagram showing an embodiment of a procedure for receiving, selecting, and presenting advertisements to a user.

FIG. 7 is a flow diagram showing an embodiment of a procedure 700 for receiving, selecting, and presenting advertisements to a user. The embodiment shown in FIG. 7 maintains a viewer's privacy by not communicating viewer interests or viewer preferences to the video source, the advertisement source, or other system or entity. Procedure 700 begins by receiving video data from a video source (block 702). Next, the procedure retrieves advertisement data likely to be of interest to a viewer of the received video data (block 704). Selection of the retrieved advertisement data is based on information known about the received video data. However, selection of the retrieved advertisement data is not based on any information known about the likely viewer of the received video data, thereby maintaining the privacy of the likely viewer.

Procedure 700 continues by storing the retrieved advertisement data on the local player (block 706) for future playback. Next, the procedure learns user interests and preferences (block 708), for example by monitoring user selection of objects and/or user control of video playback, as discussed herein. The procedure then selects an advertisement from among the retrieved advertisement data based on learned user interests and preferences (block 710). The selected advertisement is played a the appropriate time (block 712), such as during the next advertisement segment in the video data.

Figure 8:
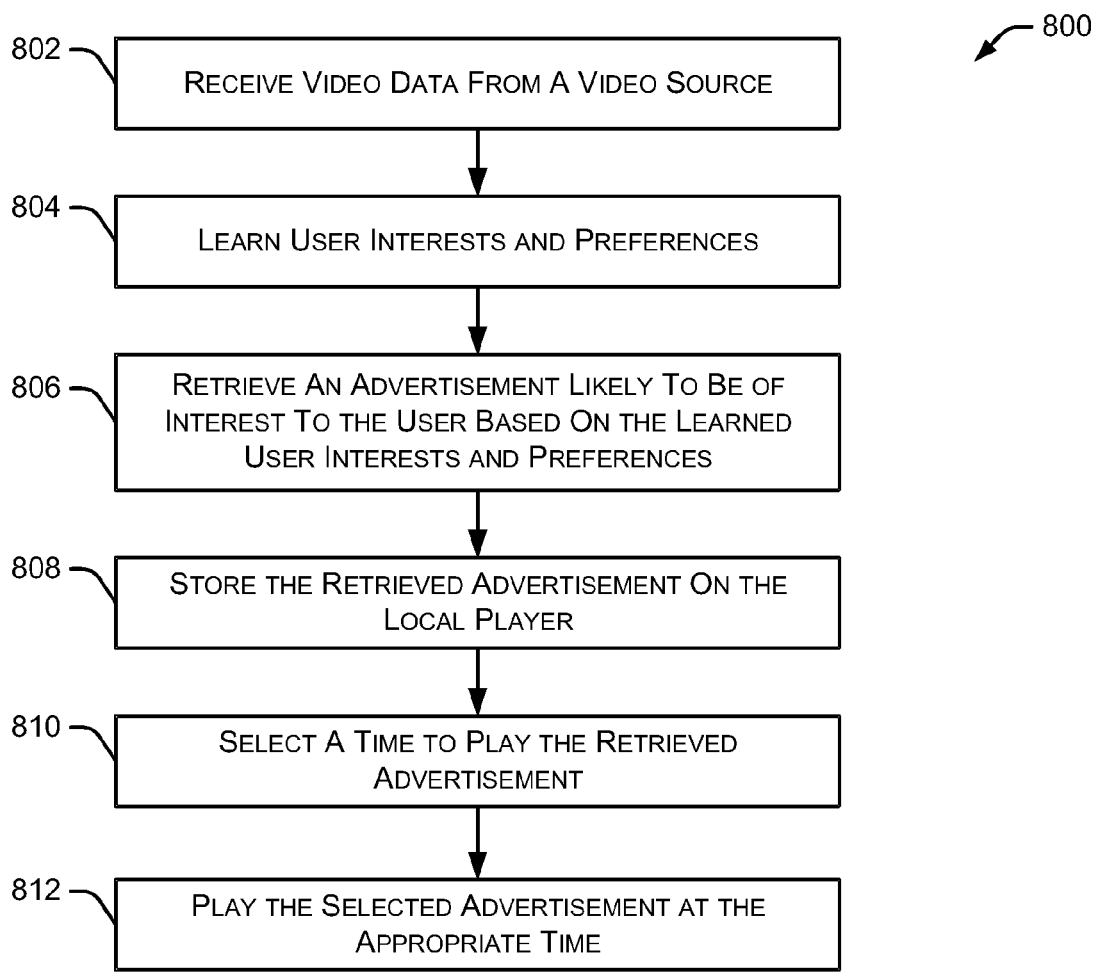
FIG. 8 is a flow diagram showing another embodiment of a procedure for receiving, selecting, and presenting advertisements to a user.

FIG. 8 is a flow diagram showing another embodiment of a procedure 800 for receiving, selecting, and presenting advertisements to a user. The embodiment shown in FIG. 8 provides an increased likelihood of selecting advertisements that are of greater interest to the viewer by selecting advertisements based on user interests and preferences. Procedure 800 begins by receiving video data from a video source (block 802). Next, the procedure learns user interests and preferences (block 804), for example by monitoring the user's selection of objects and/or the user's control of video playback, as discussed herein. Procedure 800 continues by retrieving an advertisement likely to be of interest to the user based on the learned user interests and preferences (block 806). In this embodiment, the procedure already knows the user interests and preferences before retrieving an advertisement, which increases the likelihood of selecting an advertisement that is interesting to the user.

The procedure of FIG. 8 continues by storing the retrieved advertisement on the local player (block 808) for future playback. Next, the procedure selects a time to play the retrieved advertisement (block 810), and plays the selected advertisement at the appropriate time (block 812).

Figure 9:
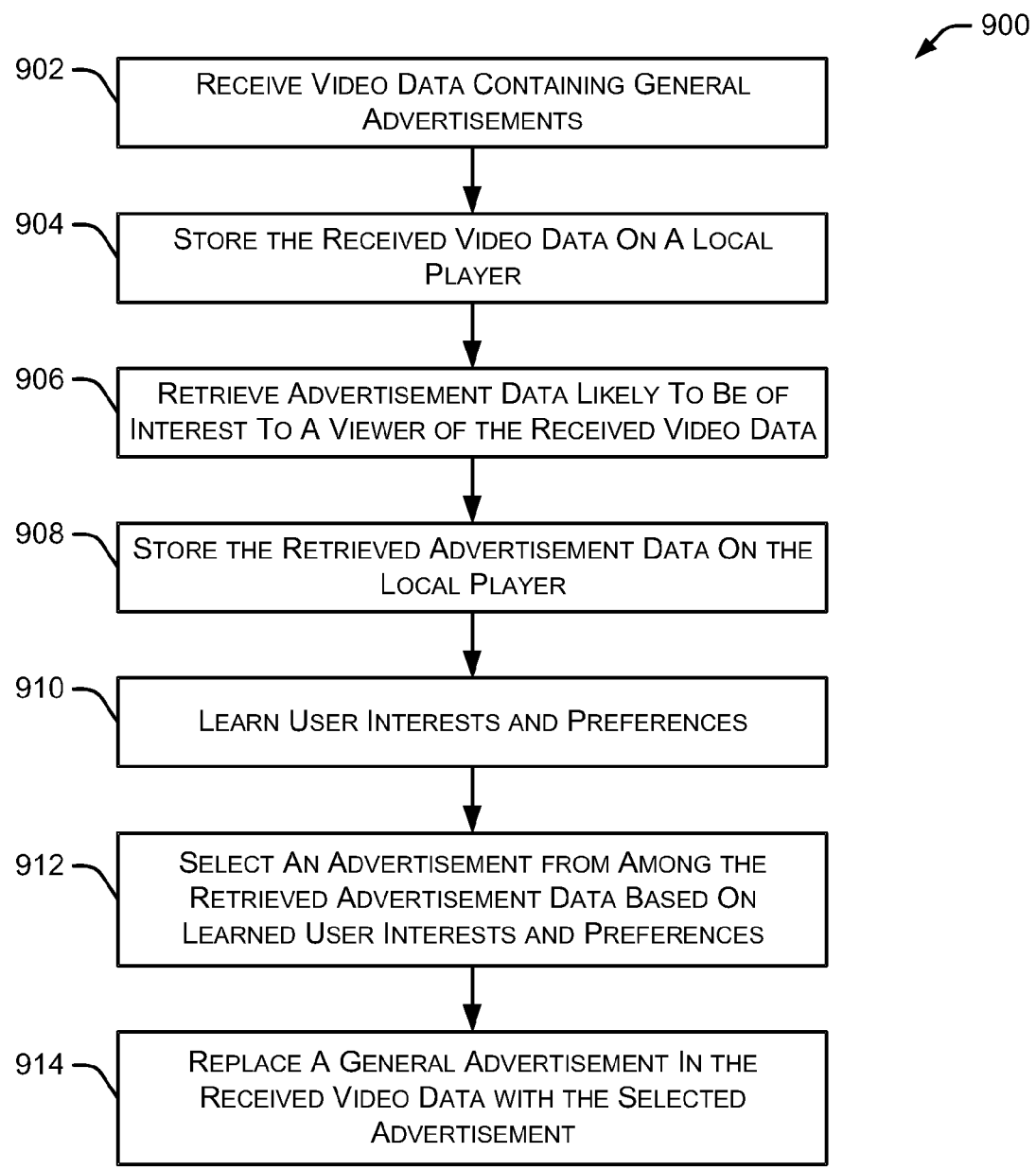
FIG. 9 is a flow diagram showing an embodiment of a procedure for replacing general advertisements contained in video data.

FIG. 9 is a flow diagram showing an embodiment of a procedure 900 for replacing general advertisements contained in video data. The procedure begins by receiving video data containing one or more general advertisements (block 902). These general advertisements are typically the advertisements presented to all viewers of the video data when no additional information is known about the viewer's interests or preferences. The received video data is stored on a local player (block 904) for future playback. In a particular embodiment, the local player is a digital video recorder, personal video recorder, or other device containing a non-volatile storage device, such as a hard disk drive.

Procedure 900 continues by retrieving advertisement data likely to be of interest to a viewer of the received video data (block 906). In this embodiment, the advertisement data is retrieved without knowledge of the viewer's interests or preferences. In alternate embodiments, the advertisement data is retrieved based, at least in part, on the known viewer interests and/or preferences. The procedure continues by storing the retrieved advertisement data on the local player (block 908). Next, the procedure learns user interests and preferences (block 910), for example by monitoring the user's selection of objects and/or the user's control of video playback, as discussed herein. An advertisement is then selected from among the retrieved advertisement data based on the learned user interests and preferences (block 912). The selected advertisement is then used to replace one of the general advertisements in the received video data (block 914). In a particular embodiment, this replacement of the general advertisement causes the general advertisement to be deleted from the storage device in the player and replaced with the selected advertisement. The next time the received video data is played, the selected advertisement will be played instead of the originally received general advertisement.

In particular embodiments, procedure 900 continually retrieves new advertisement data likely to be of interest to a viewer of the received video data, and updates advertisements contained in the stored video data. Thus, each time a viewer watches a particular video program, one or more of the advertisements may be different from the previous viewing of the same video program. For example, each time a user watches a program "American Experts", they may receive a trailer for the next broadcast episode of American Experts independently of the actual episode being viewed. If the user rewinds the currently viewed episode (e.g., rewinding prior to the trailer advertisement), the next time the advertisement segment is played, the trailer for the next broadcast can be replaced with, for example, an advertisement for a DVD containing the best episodes of American Experts.

Figure 10A:
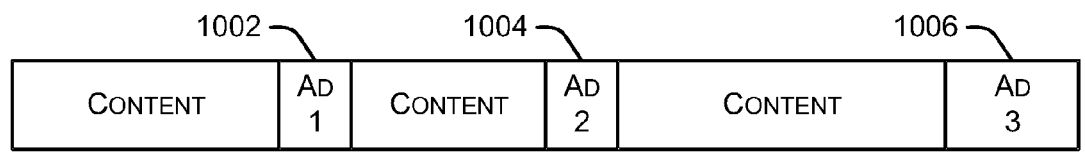
FIGS. 10A-10B show embodiments of a stored video program with varying advertisements.
Figure 10B:
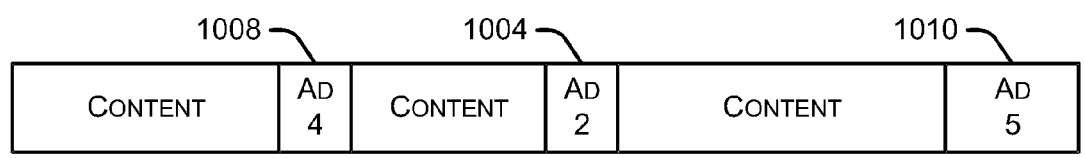

FIGS. 10A-10B show embodiments of a stored video program with varying advertisements. FIG. 10A shows three advertisements 1002, 1004 and 1006 in the video program along with three content sections. The advertisements 1002, 1004 and 1006 shown in FIG. 10A represent the originally received general advertisements. Using the procedure of FIG. 9 (or a similar procedure), two of the general advertisements are replaced with different (targeted) advertisements as shown in FIG. 10B. Specifically, general advertisement 1002 is replaced with targeted advertisement 1008, and general advertisement 1006 is replaced with targeted advertisement 1010.

Various systems and methods can identify, correlate, track, match, and align video frames and video sequences. A particular embodiment for performing these types of functions is discussed below. Video data includes spatio-temporal data, containing two spatial dimensions and one temporal dimension (i.e., the two dimensional video images and the time sequence of the different video frames). We distinguish between temporal and spatial correspondence of two different video frames. Temporal correspondence is performed at the time granularity of the time between different video frames: the video sequences are regarded as one-dimensional ordered sequences of frames, and the matching produces a correspondence between the frames in the two sequences. Spatial correspondence is performed at a sub-frame granularity, finding matching between corresponding pixels or regions of pixels "things" within two frames in the sequences.

The correspondence and similarity problems are intimately related, and usually computing one problem allows one to infer that the other problem is also being computed. For example, we can define the similarity as the amount of corresponding parts of the video. Conversely, if we have a criterion of similarity between the different parts of the video sequences, we can define a correspondence that maximizes this part-wise similarity.

Here we want to distinguish between two types of similarity: semantic and visual. "Visual" similarity of two objects implies that they "look similar", i.e., their pixel representation is similar. "Semantic" similarity implies that the concepts represented by the two objects are similar. Semantic similarity defines much wider equivalence classes than visual similarity. For example, a truck and a Ferrari are visually dissimilar, but semantically similar (both represent the concept of a vehicle). As a rule, visual similarity is easier to quantify and evaluate, while semantic similarity is more subjective and problem-dependent.

There is almost always noise and distortion in video signals, caused by differing angles, lighting conditions, editing, resolution, and the like. Here an ideal similarity criterion should be invariant to these and other variations. In terms of nomenclature, if the similarity criterion deems the depictions of two objects similar no matter how they are illuminated, we say that the similarity is invariant to lighting conditions.

The described systems and methods allow for edit- and distortion-invariant matching of video sequences. More specifically, the systems and methods provide a framework for spatio-temporal matching based on visual similarity, which is invariant to temporal distortions (transformations like frame rate change), temporal edits (removal and insertion of frames), spatial distortions (pixel-wise operations) and spatial edits (removal or insertion of content into frames). On a mathematical level, the problem of spatio-temporal matching can be formulated as: given two video sequences, find a correspondence between the spatio-temporal system of coordinates (x, y, t) in the first sequence and the spatio-temporal system of coordinates (x', y', t') in the second system.

Thinking of video data as a three-dimensional array of pixels, the spatio-temporal matching problem can be considered as finding the correspondence between three-dimensional arrays. In general, this problem is so computationally complex (complexity level NP-complete), as to be impractical to compute. This is because without further simplification, the computing system will try to find matching between all the possible subsets of pixels between the first and the second sequences, which is a very large number of operations.

However, the matching problem can be greatly simplified if the problem is split into two separate processes: temporal matching and spatial matching. Here the problem of spatial matching is more complex because the video frames are two dimensional, and thus a large number of two dimensional comparisons must be made. In contrast, the one-dimensional temporal matching problem, although still complex, is enough simpler that one-dimensional (temporal) signals can be matched very efficiently using the video DNA or video genomics dynamic programming methods discussed herein.

Figure 11:
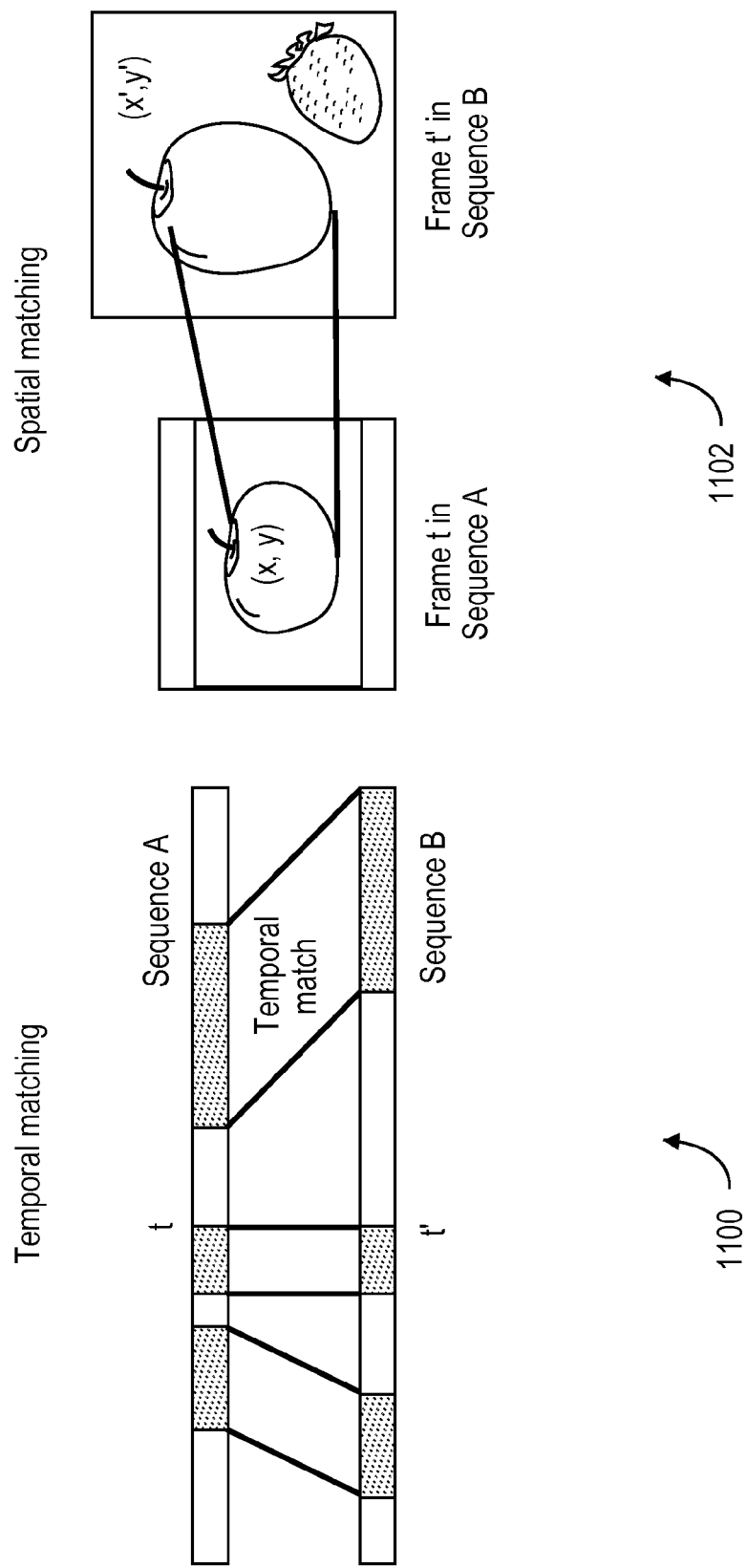
FIG. 11 shows examples of spatial alignment of video data and temporal alignment of video data.

FIG. 11 shows examples of spatial alignment of video data and temporal alignment of video data. At a first stage 1100 of FIG. 11, temporal matching is performed (this step is discussed in more detail below). Temporal matching produces the correspondence between the temporal coordinate "t" in a subset of the first video sequence and the temporal coordinate "t" in a subset of the second video sequence. By performing temporal matching, we avoid the need to try to perform two dimensional spatial matching between all the possible subsets of pixels in the video sequences (essentially a three dimensional matching problem). Rather, the problem is reduced in size so that the spatial matching must now only be performed between the small subsets of temporally corresponding portions of the video sequences. In other words, for the spatial matching, a large 3D matching problem is turned into a much smaller 2D matching problem between relatively small sets of 2D video frames. For example, instead of trying to match the "apple" series of pixels "thing" from the entire upper video sequence into a corresponding "apple" thing in the entire lower video sequence, now just the small number of frames in "sequence A" and "sequence B" which are most relevant are examined.

Typically, one of the video sequences is a short query, and thus the size of the temporally corresponding portions of the video sequences is small, which greatly reduces the problem of spatial matching, discussed below. At a second stage 1102 of FIG. 11, spatial matching between the temporally corresponding video data is performed. Spatial matching produces the correspondence between the spatial coordinates (x, y) and (x', y') in the temporally matching portions (e.g., frames) of the first and second sequences.

In the described systems and methods, the matching can be made more robust and invariant to distortions and edits of the video content. In particular, the temporal matching can be made to be invariant to temporal edits of the video sequences. Spatial matching can be made to be invariant to spatial distortions and edits of the video sequences (for example, the different aspect ratio of the apple, different lighting, and the background of different fruits shown in FIG. 11).

It should be understood that the methods described herein are normally carried out in a computer system containing at least one processor (often a plurality of processors will be used), and memory (often megabytes or gigabytes of memory will be used). Processors suitable for implementing the methods of the present invention will often be either general purpose processors, such as x86, MIPS, Power, ARM, or the like, or they may be dedicated image interpretation processors, such as video processors, digital signal processors, field programmable gate arrays, and the like. The methods described herein may be programmed in a high level language, such as "C", C+", java, Perl, Python, and the like, programmed in a lower level assembly language, or even embedded directly into dedicated hardware. The results of this analysis may be stored in either volatile memory, such as RAM, or in non-volatile memory such as flash memory, hard drives, CD, DVD, Blue-ray disks, and the like.

Visual information (video images) can be represented by means of a small number of "points of interest", also called "features". Typically, features are points that are easily detectable in the image in a way that is invariant to various image modifications. A "feature" in an image includes both the coordinates of the "point of interest" as well as a "descriptor" which typically describes the local image content or environment around the "point of interest". Features are often chosen for their ability to persist even if an image is rotated, presented with altered resolution, presented with different lighting, etc.

A feature is often described as a vector of information associated with a spatio-temporal subset of the video. For example, a feature can be the 3D direction of a spatio-temporal edge, local direction of the motion field, color distribution, etc. Typically, local features provide a description of the object, and global features provide the context. For example, an "apple" object in a computer advertisement and an "apple" object in an image of various fruits may have the same local features describing the object, but the global context will be different.

For example, local features may include:

Harris corner detector and its variants, as described in C. Harris and M. Stephens, "A combined corner and edge detector", Proceedings of the 4th Alvey Vision Conference, 1988;

Scale invariant feature transform (SIFT), described in D. G. Lowe, "Distinctive image features from scale-invariant keypoints," International Journal of Computer Vision, 2004;

Motion vectors obtained by decoding the video stream;

Direction of spatio-temporal edges;

Distribution of color;

Description of texture;

Coefficients of decomposition of the pixels in some known dictionary, e.g., of wavelets, curvelets, etc.

Specific objects known a priori.

Extending this idea to video data, we can abstract a video sequence into a three-dimensional structure of features (two spatial dimensions formed by the various 2D images, and one time dimension formed by the various video frames). This 3D structure can be used as the basic building blocks of a representation of the video sequence.

As previously discussed, it can be extremely useful to think about video analysis problems in biological terms, and draw insight and inspiration from bioinformatics. Here, for example, it is useful to think of the features as "atoms", the feature abstraction of the various video frames in a video as a "nucleotide", and the video itself as being like an ordered sequence of nucleotides, such as a large DNA or RNA molecule.

The spatial and the temporal dimensions in the video sequence have different interpretations. Temporal dimension can be though of as ordering of the video data—we can say that one feature comes before another. If we divide the video sequence into temporal intervals, we can consider it as an ordered sequence of "video elements", each of which contains a collection of features. As previously discussed, here we consider the video data to be an ordered sequence of smaller nucleotides, and we consider a video signal to be also composed of a string of "nucleotide-like" video subunits, called video DNA.

Drawing upon inspiration from DNA sequence analysis, the systems and methods can represent a video both as three-, two- and one-dimensional signals. Considering the entire set of feature points, we have a three-dimensional (spatio-temporal) structure. Considering the sequence of temporal intervals, we obtain a one-dimensional representation. Considering one frame in the sequence, we obtain a two-dimensional representation. The same representation is used to carry out the temporal and spatial matching stages. An example two-stage matching approach follows.

At the first stage, a temporal representation of the video sequences is created. Each video sequence is divided into temporal intervals. Here a temporal interval is usually not just a single video frame, but rather is often a series of at least several video frames (e.g., 3 to 30 frames) spanning a fraction of a second. Temporal intervals are discussed in greater detail herein.

For each time interval, the actual video image is abstracted into a representation (also referred to herein as a visual nucleotide) containing just the key features in this interval. This series of features is then further abstracted and compressed by discarding the spatio-temporal coordinates of the various features. For example, we just start counting different types of features. In other words, we only keep track of the feature descriptors, and how many different types of feature descriptors there are.

Each time division of the video signal (which we will call a "nucleotide" in analogy to a biological nucleotide) is represented as an unordered collection or "bag" of features (or a bag of feature descriptors). Thus, if each feature is considered to be a "visual atom", the "bag of features" that represents a particular video time interval can be called a "nucleotide". The representations of the various video time intervals (visual nucleotides) are then arranged into an ordered "sequence" or map (video DNA). In this discussion, we will generally use the term "nucleotide" rather than "bag of features" because it helps guide thinking towards a useful bioinformatic approach to video analysis procedures.

The video map/video DNAs corresponding to two video sequences can be aligned in much the same way that DNA sequences can be compared and aligned. In DNA sequence analysis, one of the central problems is trying to find alignment which gives the best correspondence between subsets of the two DNA sequences by maximizing the similarity between the corresponding nucleotides and minimizing the gaps. In the systems and methods described herein, algorithms similar to those used in bioinformatics for DNA sequence alignment can be used for aligning two different video signals.

After two portions of video media are matched by the first stage, additional image analysis can be done. For example, at the second stage, the spatial correspondence between temporally corresponding subsets of the video sequences can be found. That is, "things" (pixel groups) shown in a first video can be matched with "things" shown in a second video. More specifically, we can now look for spatial correspondence between the contents of two temporally-corresponding video image frames.

In this later second stage, we do not discard the spatio-temporal coordinates of the features. Rather, in this second stage each frame is represented as a two-dimensional structure of features, and we retain the feature coordinates. For this second stage purpose of spatial matching of frames and comparing the contents of the video frames, more standard feature-based algorithms, previously used in computer vision literature can now be used.

For object recognition, and other applications where object-based analysis is required, the "video genomics" approach offers significant advantages over prior art methods, including the following. First, the systems and methods described herein offer a higher discriminative power than standalone object descriptors. This discriminative power is due to the discriminative power of the object descriptors themselves as well as the temporal support, i.e., the time sequence of these descriptors. Although some existing methods teach that the best discrimination is obtained when a large number of precisely optimized features are used, we have found that this is not the case. Surprisingly, we have found that when the systems and methods described herein are compared on a head-to head basis with prior art techniques, it turns out that the temporal support (i.e., the time order in which various feature groups appear) is more important for discriminative power than is a very large number of different descriptors. For example, increases in accuracy in object description are usually desirable. The prior art "brute force" way to increase accuracy would be to simply use more and more features and feature descriptors, but since each feature and feature descriptor is computationally intensive to produce, this prior art "brute force" approach rapidly reaches a point of diminishing returns due to high computational overhead.

However, we have found that an increase of accuracy of object description that would otherwise require a prior art increase of the visual vocabulary size by two orders of magnitude (increasing computational overhead by nearly two orders of magnitude as well) can be easily matched by the described systems and methods using a computationally less intense process. Using the systems and methods described herein, to improve accuracy, we avoid increasing the number of feature descriptors, and instead improve accuracy by an increase in the time resolution of the analysis. This is done by simply adding two more "nucleotides" (i.e., using slightly smaller time divisions in the video analysis) to the "video DNA" sequences being compared. By avoiding a drastic increase in the number of features, the systems and methods can achieve high accuracy, yet can be much more efficient from a computational overhead standpoint.

Prior art approaches, such as J. Sivic and A. Zisserman, "Video Google: a text retrieval approach to object matching in video" approached video as a collection of images and thus had to use feature "vocabularies" of very large size (up to millions of elements) in order to obtain high descriptive power. By contrast, the described use of temporal support gives equal or better results using much smaller feature vocabularies (hundreds or thousands of elements), with a corresponding large increase in computational efficiency.

A second advantage is that for content-based retrieval applications, the described systems and methods allow retrieval of both an object of interest, and the context in which the object appears. The temporal sequence can be considered as additional information describing the object, in addition to the description of the object itself.

Figure 12:
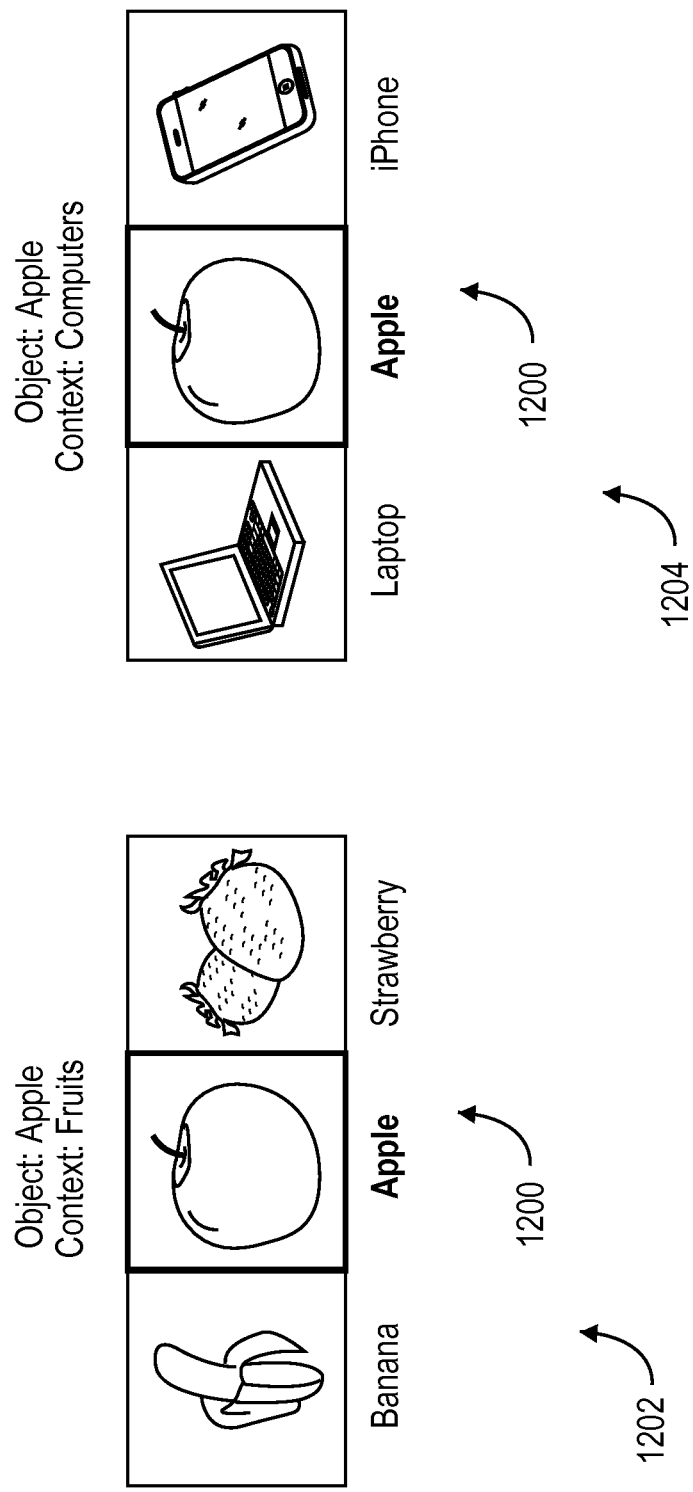
FIG. 12 shows an example context representation using video genomics.

FIG. 12 shows an example of the same object (an apple 1200) appearing in two different contexts: Fruits 1202 and Computers 1204. In the first case, the "Apple" object appears in a sequence with a Banana and a Strawberry, which places the object in the context of Fruits. In the second case, the Apple object appears in sequence with a Laptop and an iPhone, which places the object in the context of Computers. Here, the systems and methods are sophisticated enough to recognize these context differences. As a result, the Video map/Video DNA representation in these two cases will be different, despite the fact that the object itself is the same.

By contrast, prior art approaches, such as Sivic and Zisserman, do not take into consideration the context of the video content, and thus are unable to distinguish between the two different instances of the apple object in the above example.

A third advantage is that the described "Video genomics" approach allows for performing partial comparison and matching of video sequences in many different ways. Just as methods from bioinformatics allow different DNA sequences to be compared, two different video DNA sequences can be matched despite having some dissimilar video frames (nucleotides), insertions or gaps. This is especially important when invariance to video alterations such as temporal editing is required—for example, when the video DNAs of a movie and its version with inserted advertisements need to be matched correctly.

Figure 13:
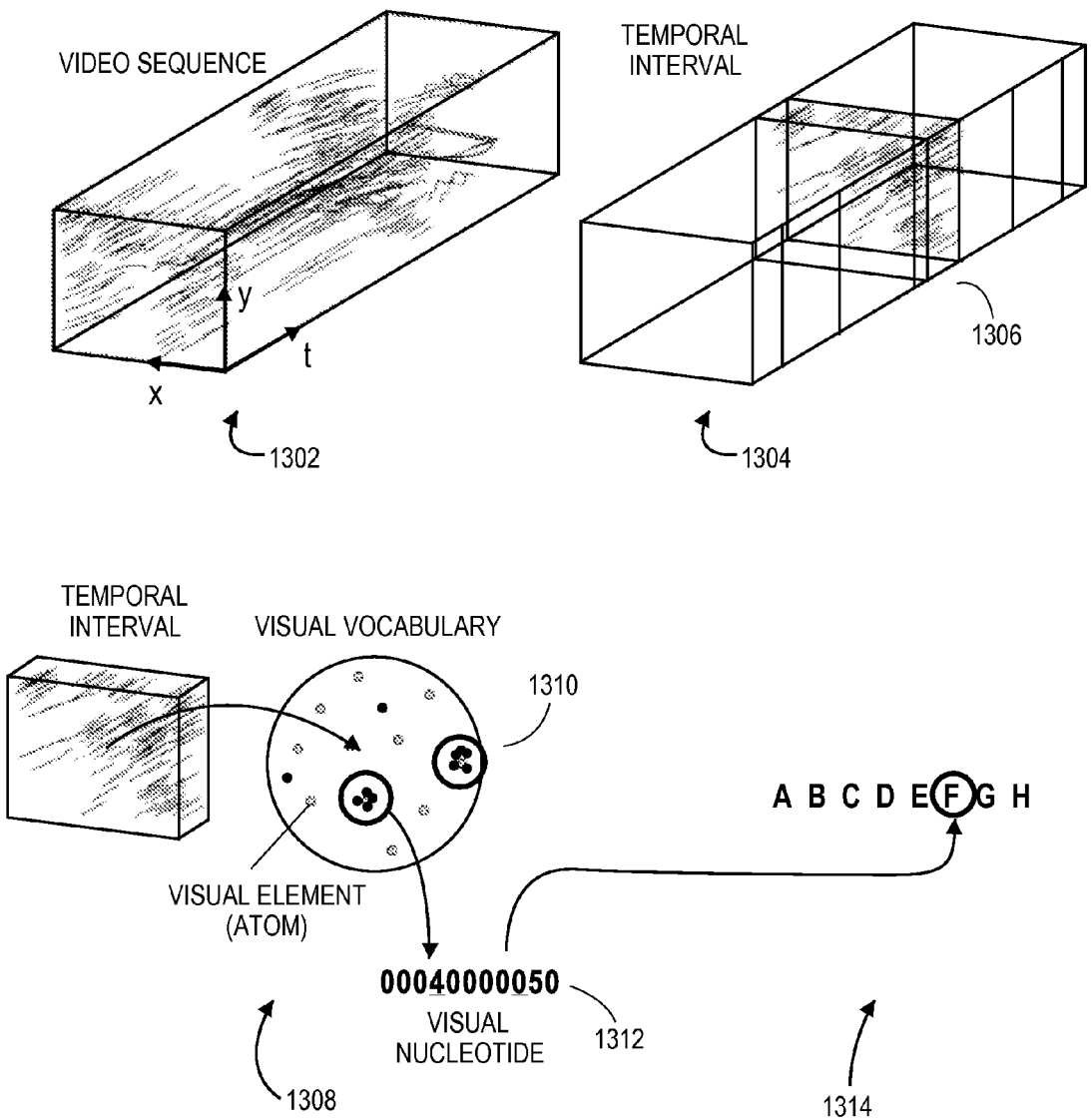
FIG. 13 shows an example procedure for the formation of video DNA.

FIG. 13 presents a conceptual scheme of an example creation of the video map/video DNA representation of a video sequence. The procedure consists of the following stages. At a first stage 1302, a local feature detector is used to detect points of interest in the video sequence. Suitable feature detectors include the Harris corner detector disclosed in C. Harris and M. Stephens "A combined corner and edge detector", Alvey Vision Conference, 1988; or the Kanade-Lucas algorithm, disclosed in B. D. Lucas and T. Kanade, "An iterative image registration technique with an application to stereo vision", 1981; or the SIFT scale-space based feature detector, disclosed in D. G. Lowe, "Distinctive image features from scale-invariant keypoints", IJCV, 2004.

The points of interest can be tracked over multiple video frames to prune insignificant or temporally inconsistent (e.g., appearing for a too short of a time period) points. This will be discussed in more detail later. The remaining points are then described using a local feature descriptor, e.g., SIFT based on a local distribution of gradient directions; or Speed up robust features (SURF) algorithm, described in H. Bay, T. Tuytelaars and L. van Gool, "Speed up robust features", 2006. The descriptor is represented as a vector of values.

The feature detection and description algorithms should be designed in such a way that they are robust or invariant to spatial distortions of the video sequence (e.g., change of resolution, compression noise, etc.) The spatio-temporal feature locations and the corresponding feature descriptors constitute the most basic representation level of the video sequence.

At a second stage 1304, the video sequence is segmented into temporal intervals 1306 which often span multiple individual video frames (often 3 to 30 frames). Such segmentation can be done, for example, based on the feature tracking from the previous stage. It should be noted that the segmentation is ideally designed to be rather invariant to modifications of the video such as frame rate change. Another way is to use time intervals of fixed size with some time overlap. At a third stage 1308, the features in each temporal interval are aggregated. As previously discussed, the spatio-temporal locations (feature coordinates) at this stage are not used. Rather, the information in the temporal interval is described using a "bag of features" approach 1310.

Here, similar to Sivic and Zisserman, all the feature descriptors are represented using a visual vocabulary (a collection of representative descriptors obtained, for example, by means of vector quantization). Each feature descriptor is replaced by the corresponding closest element in the visual vocabulary. As previously discussed, features represented in this way are also referred to herein as visual atoms. Continuing this analogy, the visual vocabulary can be thought of as a "periodic table" of visual elements.

Unlike the prior art approach of Sivic and Zisserman, however, here we discard the spatial coordinates of the features, and instead represent the frequency of appearance of different visual atoms in the temporal interval as a histogram (group or vector), which is referred to as a "representation", "visual nucleotide", "nucleotide" and occasionally "bag of features" 1310. Here a "visual nucleotide 1312 is essentially the "bag" of features created by discarding the spatial coordinates and just counting frequency of occurrence (this process is referred to as a "bag function" or "grouping function") that represents a certain number of video frames from the video. If a standardized set of visual elements is used to describe the contents of each "bag", then a visual nucleotide can be represented mathematically as a histogram or sparse vector. For example, if the "bag of features" describing several video images contains 3 cases of feature 1, 2 cases of feature 2, and 0 cases of feature 3, then the visual nucleotide or "bag" that describes these video images can be represented as the histogram or vector (3,2,0). In this example, the visual nucleotide (321) is represented as the histogram or vector (0, 0, 0, 4, 0, 0, 0, 0, 0, 5, 0).

The "bag of features" representation allows for invariance to spatial editing: if the video sequence is modified by, for example, overlaying pixels over the original frames, the new sequence will consist of a mixture of features (one part of old features belonging to the original video and another part of new features corresponding to the overlay). If the overlay is not very significant in size (i.e., most of the information in the frame belongs to the original video), it is possible to correctly match two visual nucleotides by requiring only a certain percentage of feature elements in the respective "bags" (i.e., sparse vectors) to coincide.

Finally, all the visual nucleotides (or feature bags) are aggregated into an ordered sequence referred to as a video map or video DNA 1314. Each representation (or visual nucleotide, "bag", histogram or sparse vector) can be thought of as a generalized letter over a potentially infinite alphabet, and thus the video DNA is a generalized text sequence.

The temporal matching of two video sequences can be performed by matching the corresponding video DNAs using a variety of different algorithms. These can range from very simple "match/no match algorithms", to bioinformatics-like "dot matrix" algorithms, to very sophisticated algorithms similar to those used in bioinformatics for matching of biological DNA sequences. Examples of some of these more complex bioinformatics algorithms include the Needleman-Wunsch algorithm, described in S. B Needleman, C. D Wunsch, "A general method applicable to the search for similarities in the amino acid sequence of two proteins", 1970; Smith-Waterman algorithm, described in T. F. Smith and M. S. Waterman, "Identification of common molecular subsequences", 1981; and heuristics such as Basic Local Alignment Search Tool (BLAST), described in S. F. Alschul et al., "Basic Local Alignment Search Tool", 1990.

Often, a suitable sequence matching algorithm will operate by defining a matching score (or distance), representing the quality of the match between two video sequences. The matching score comprises two main components: similarity (or distance) between the nucleotides and gap penalty, expressing to the algorithm the criteria about how critical it is to try not to "tear" the sequences by introducing gaps.

In order to do this, the distance between a nucleotide in a first video and a corresponding nucleotide in a second video must be determined by some mathematical process. That is, how similar is the "bag of features" from the first series of frames of one video similar to the "bag of features" from a second series of frames from a second video? This similarity value can be expressed as a matrix measuring how similar or dissimilar the two nucleotides are. In a simple example, it can be a Euclidean distance or correlation between the vectors (bags of features) representing each nucleotide. If one wishes to allow for partial similarity (which frequently occurs, particularly in cases where the visual nucleotides may contain different features due to spatial edits), a more complicated metric with weighting or rejection of outliers should be used. More complicated distances may also take into consideration the mutation probability between two nucleotides: two different nucleotides are more likely similar if they are likely to be a mutation of each other. As an example, consider a first video with a first sequence of video images, and a second video with the same first sequence of video images, and a video overlay. Clearly many video features (atoms or elements) in the bag describing the first video will be similar to many video features in the bag describing the second video, and the "mutation" here is those video features that are different because of the video overlay.

The gap penalty is a function accounting for the introduction of gaps between the nucleotides of a sequence. If a linear penalty is used, it is simply given as the number of gaps multiplied by some pre-set constant. More complicated gap penalties may take into consideration the probability of appearance of a gap, e.g., according to statistical distribution of advertisement positions and durations in the content.

The following discussion identifies example similarities and differences between biological DNA and video DNA. Because the systems and methods discussed herein essentially transform the problem of matching corresponding portions of different video media into a problem that bears some resemblance to the problem of matching biological DNA sequences, some insight can be obtained by examining this analogy in more detail. Since DNA sequence matching art is in a comparatively advanced state of development, relative to video matching art, the systems and methods have the unexpected result of showing how a number of advanced DNA bioinformatics methodology techniques can be unexpectedly applied to the very different field of matching video signals.

As previously discussed, at the conceptual level, there is a strong similarity between the structure of biological DNA and the described video DNA methods. A biological DNA is a sequence composed of nucleotides, the same way as video DNA is composed of visual nucleotides (bags of features from multiple video frames). A nucleotide in biology is a molecule composed of atoms from a periodic table, the same way as a visual nucleotide is a bag of features composed of visual atoms (i.e., features) from the visual vocabulary (usually a standardized pallet of different features).

Figure 14:
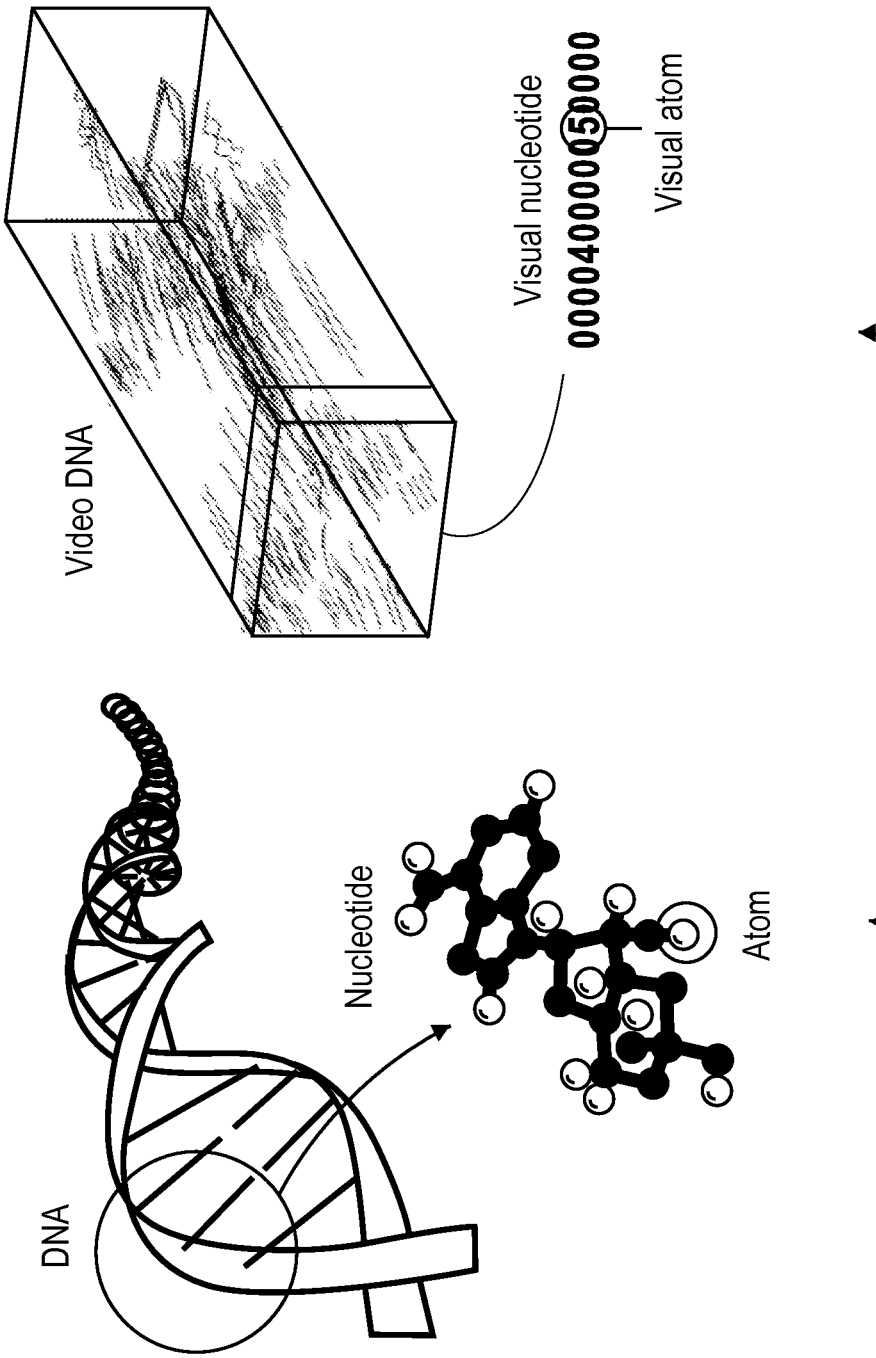
FIG. 14 shows an example comparison between biological DNA and video DNA.

FIG. 14 graphically shows the reason for the name "video DNA" by showing the analogy between an abstracted video signal 1400, and the structure of a biological DNA molecule and its constituents (nucleotides and atoms) 1402. Despite the conceptual similarity, the are many specific differences between the biological and video DNA. First, the size of the periodic table of atoms that appear in biological molecules is small, usually including only a few elements (e.g., Carbon, Hydrogen, Oxygen, Phosphorous, Nitrogen, etc.) In video DNA, the size of the visual vocabulary of features (atoms) is typically at least a few thousands up to a few millions of visual elements (features). Second, the number of atoms in a typical nucleotide molecule is also relatively small (tens or hundreds). The number of "visual atoms" (features) in a visual nucleotide (bag of features) is typically hundreds or thousands. Whereas in a biological nucleotide, the spatial relationship and relationship between atoms is important, for a video nucleotide, this relationship (i.e., the feature coordinates) between features is deemphasized or ignored.

Third, the number of different nucleotides in biological DNA sequences is small—usually four ("A", "T", "G", "C") nucleotides in DNA sequences and twenty in protein sequences. By contrast, in video DNA, each visual nucleotide is a "bag of features" usually containing at least hundreds of thousands of different features, and which can be represented as a histogram or vector. Thus, if a set or pallet of, for example, 500 or 1000 standardized features is used as a standard video analysis option, each "bag of features" would be a histogram or vector composed of the coefficients of how many times each one of these 500 or 1000 standardized features appeared in the series of video frames described by the "nucleotide" or "bag of features", so the number of permutations of this bag, each of which can potentially represent a different video nucleotide, is huge.

These factual differences make video DNA matching only similar in its spirit to biological sequence matching. In some aspects, the video matching problem is more difficult and in some respects it is easier. More specifically, the matching algorithms are different in the following aspects.

First, in biological sequences, since the number of different nucleotides is small, the score of matching two nucleotides can be represented as a simple "match", "don't match" result. That is, a biological nucleotide can be an "A", "T", "G" or "C", and there either is an "A" to "A" match, or there is not. By contrast, each nucleotide in video DNA is itself an array, histogram, vector or "bag of features" that often will have hundreds or thousands of different coefficients, and thus the matching operation is more complex. Thus, for video DNA, we need to use a more general concept of "score function" or "distance function" between nucleotides. This score can be thought of as some kind of distance function between histograms or vectors. In other words, how far apart are any two different "bags of features"?

Otherwise, many other concepts, such as homology scores, insertions, deletions, point-mutations, and the like have a remarkable resemblance between these two otherwise very different fields.

Figure 15:
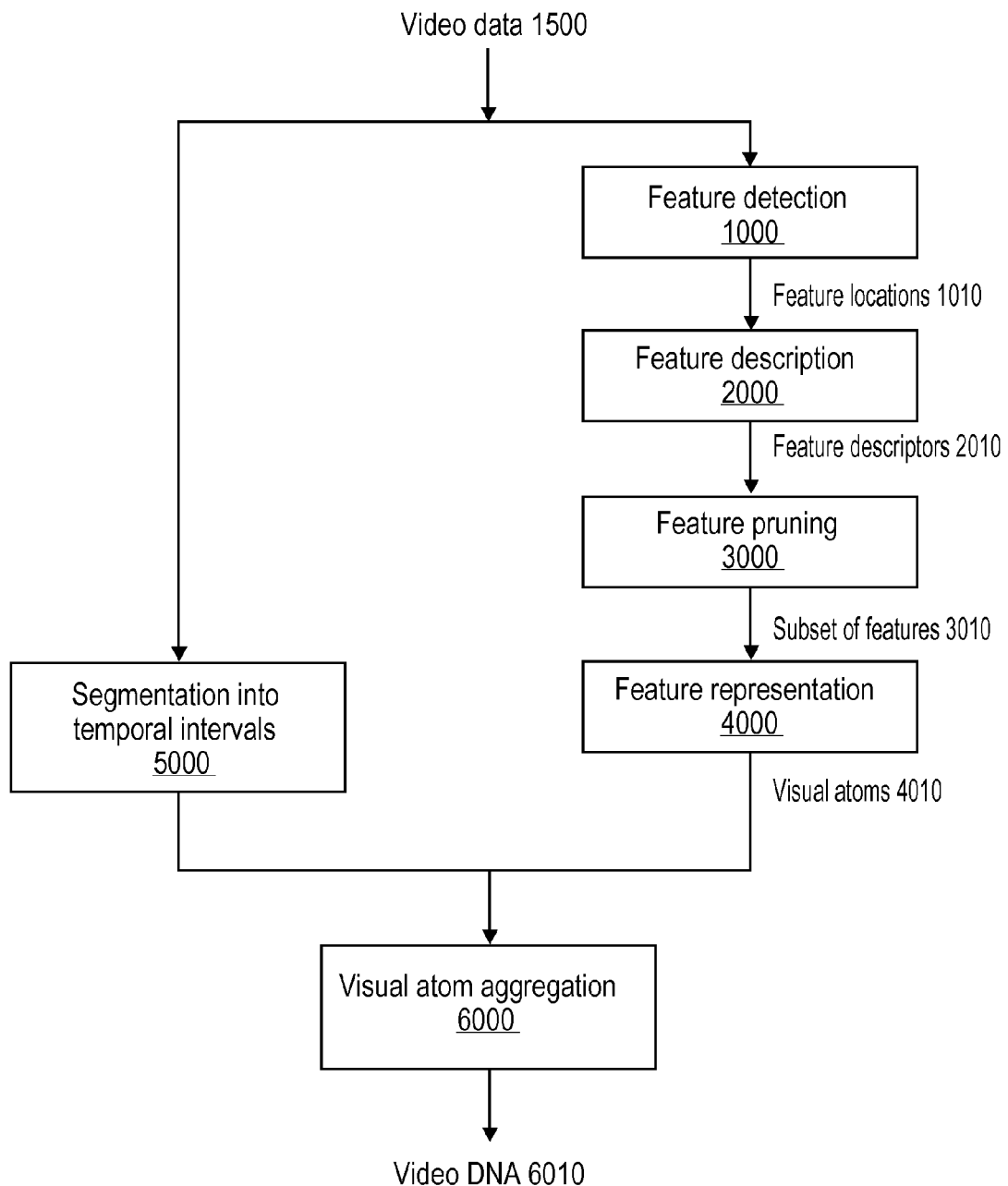
FIG. 15 is a flow diagram showing an embodiment of a procedure for constructing video DNA.

In one embodiment, the video DNA of an input video sequence is computed as depicted in FIG. 15. The process of video DNA computation receives video data 1500 and includes the following stages: feature detection 1000, feature description 2000, feature pruning 3000, feature representation 4000, segmentation into temporal intervals 5000 and visual atom aggregation 6000. The output of the process is a video DNA 6010. Some of the stages may be performed in different embodiments or not performed at all. The following description details different embodiments of the above stages of video DNA computation.

As shown in FIG. 16, the video sequence is divided into a set of temporal (time) intervals. FIG. 16 shows that in one embodiment, the video time intervals 1620 are of fixed duration (e.g., 1 second) and non-overlapping. In another embodiment, time intervals 1622 have some overlap. Here each video nucleotide could be composed from as many video frames as are present in one second (or a subset of this), which depending upon frame rate per second might be 10 frames, 16, frames, 24 frames, 30 frames, 60 frames, or some subset of this.

In another embodiment, the intervals are set at the locations of shot (scene) cuts or abrupt transition in the content of two consecutive frames (identified by reference numeral 1624). It is possible to use the result of tracking to determine the shot cuts in the following way: at each frame, the number of tracks disappearing from the previous frame and new tracks appearing in the current frame is computed. If the number of disappearing tracks is above some threshold, and/or the number of new tracks is above some other threshold, the frame is regarded as a shot cut. If shot or scene cuts are used, a video nucleotide could be composed of as many video frames that are in the shot or scene cut, and this could be as high as hundreds or even thousands of video frames if the scene is very long. In another embodiment, the intervals are of constant duration and are resynchronized at each shot cut (identified by reference numeral 1626).

Figure 17:
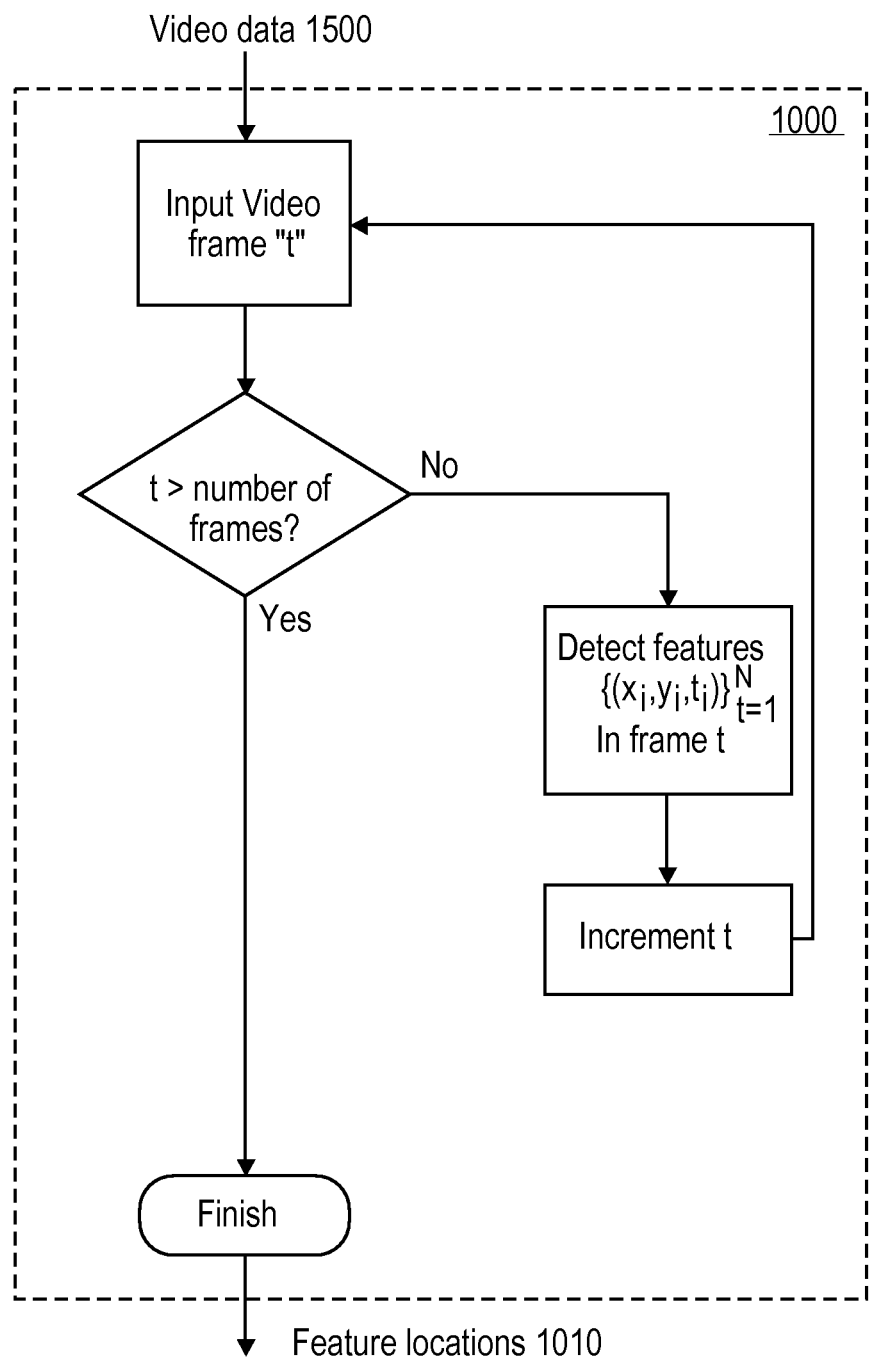
FIG. 17 is a flow diagram showing an embodiment of a procedure for frame based feature detection.

Feature detection (FIG. 15, 1000). A feature detector is operated on the video data 1500, producing a set of N invariant feature point locations, $\{(x_i, y_i, t_i)\}_{i=1}^{N}$ (denoted by 1010 in FIG. 15) where x, y and t are the spatial and temporal coordinates of the feature point, respectively. Feature detection step 1000 is shown in more detail in FIG. 17, which shows one embodiment of this method. Feature detection 1000 is performed on a frame basis. For a frame at time t, a set of $N_t$ features $\{(x_i, y_i, t)\}_{i=1}^{N_t}$, is located. Typical features have the form of two-dimensional edges or corners. Standard algorithms for invariant feature point detection described in computer vision literature can be used. Such algorithms may include, for example, the Harris corner detector, scale-invariant feature transform (SIFT), Kanade-Lucas tracker, etc.

Typical values of $N_t$ range between tens to thousands. In particular embodiments, the values of $N_t$=100, 200, ..., 1000 are used. In another embodiment, the value of $N_t$ is pre-set and is a result of feature detection algorithm used. In another embodiment, the feature detection is performed on spatio-temporal data, producing a set $\{(x_i, y_i, t_i)\}_{i=1}^{N}$. Three-dimensional versions of standard feature detection algorithms may be used for this purpose.

Feature description (FIG. 15, 2000). For each feature point detected at feature description stage 2000, a feature descriptor is computed, producing a set of feature descriptors (denoted by 2010 in FIG. 15) $\{f_i\}_{i=1}^{N}$ corresponding to the feature points. A feature descriptor is a representation of the local video information in the neighborhood of the feature point. Many feature descriptors used in computer vision literature (e.g. SIFT or SURF feature descriptors) compute a local histogram of directed edges around the feature point. Typically, a feature descriptor can be represented as a vector of dimension F, i.e., $f_i \in R^F$. For example, for SIFT feature descriptor F=128, and for SURF feature descriptor, F=64.

In a particular embodiment, the feature descriptors are computed on a frame basis, meaning that they represent the pixels in the spatial neighborhood of a feature point within one frame. Standard feature descriptors such as SIFT or SURF can be used in this case. In another embodiment, the feature descriptors are spatio-temporal, meaning that they represent the pixels in the spatio-temporal neighborhood. A three-dimensional generalization of standard feature descriptors can be used in this case.

Feature pruning (FIG. 15, step 3000). At this stage, among all the features, a subset 3010 of consistent features is found. In different embodiments, consistency may imply spatial consistency (i.e., that the feature point does not move abruptly and its position in nearby temporal locations is similar), temporal consistency (i.e., that a feature does not appear or disappear abruptly), or spatio-temporal consistency (a combination of the above).

Figure 18:
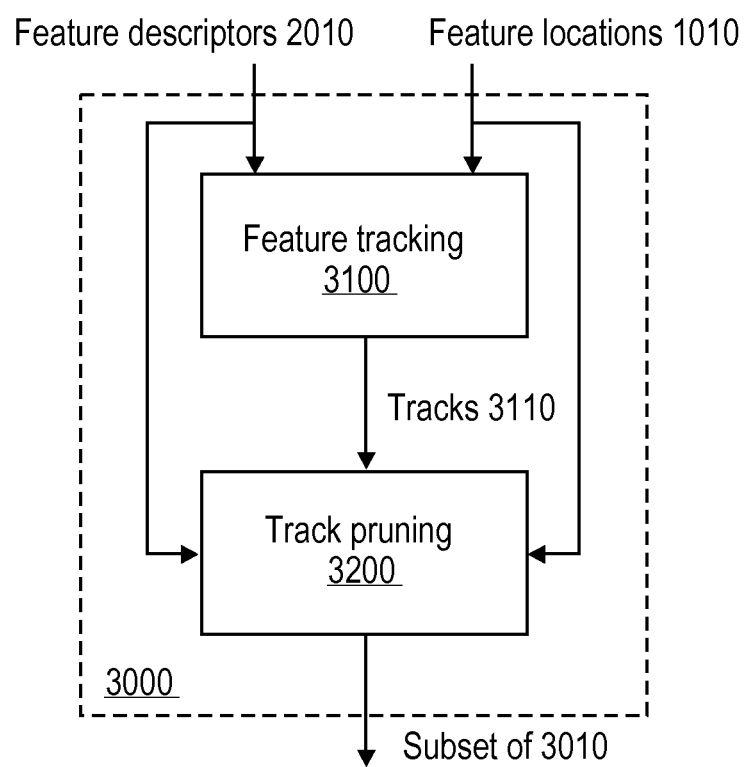
FIG. 18 is a flow diagram showing an embodiment of a procedure for feature tracking to find consistent features.

In one embodiment, tracking is performed for finding consistent features as shown in FIG. 18. A feature tracking algorithm 3100 tries to find sets of features consistently present in a sufficiently large contiguous sequence of frames, thus removing spurious features detected in a single frame. Such spurious features are known to arise, for example, from specular reflections, and their removal improves the accuracy and discriminative power of the description of the visual content in a frame.

In one embodiment, a frame-based tracking is used. This type of tracking tries to find correspondence between two sets of features $\{(x_i, y_i, t)\}_{i=1}^{N_t}$ and $\{(x_j, y_j, t')\}_{j=1}^{N_{t'}}$ in frames t and t', where usually t'=t+1/fps for fps being the frame rate. In another embodiments, tracking is performed between multiple frames at the same time.

The output of the tracker 3100 is a set of T tracks 3110, each track representing a trajectory of a feature through space-time. A track can be represented as a set of indices of feature points belonging to this track. In one of the embodiments, a track is a set of indices of the form $\tau_k = \{(i_t, t)\}_{t=t_1}^{t_2}$, implying that a set of points $\{(x_i, y_i, t)\}_{t=t_1}^{t_2}$. $t_1$ and $t_2$ are the temporal beginning and end of the track, and $t_2-t_1$ is its temporal duration. Determining the tracks may based on feature similarity (i.e., the features belonging to the track have similar descriptors), motion (i.e., the locations of the feature points do not change significantly along the track), or both. Standard algorithms for feature tracking used in computer vision literature can be used.

The consistency of the resulting tracks is checked and track pruning 3200 is performed. In one embodiment, tracks of duration below some threshold are pruned. In another embodiment, tracks manifesting high variance of spatial coordinate (abrupt motions) are pruned. In another embodiment, tracks manifesting high variance of feature descriptors of feature points along them are pruned. The result of pruning is a subset T' of the tracks, $\{\tau_k\}_{k=1}^{T'}$.

In one of the embodiments, a set of features $\{(x_i, y_i, t)\}_{i=1}^N$, and the corresponding descriptors $\{f_i\}_{i=1}^N$, are computed in the beginning of a shot t, and the tracker is initialized to $x_i(t)=x_i$, $y_i(t)=y_i$, and a Kalman filter is used to predict the feature locations $\hat{x}_i(t')$, $\hat{y}_i(t')$ in the next frame t'. The set of features $\{(x'_j, y'_j, t')\}_{j=1}^{N'}$ with the corresponding descriptors $\{f'_j\}_{j=1}^{N'}$ computed in the frame t+dt. Each feature $x_i$, $y_i$, $f_i$ is matched against the subset of the features $x'_j$, $y'_j$, $f'_j$ in a circle with a certain radius centered at $\hat{x}_i(t')$, $\hat{y}_i(t')$, and the match with the closest descriptor is selected. When no good match is found for a contiguous sequence of frames, the track is terminated. Only features belonging to tracks of sufficient temporal duration are preserved.

In one embodiment, the Kalman filter is used with a constant velocity model, and the estimated feature location covariance determines the search radius in the next frame.

Figure 19:
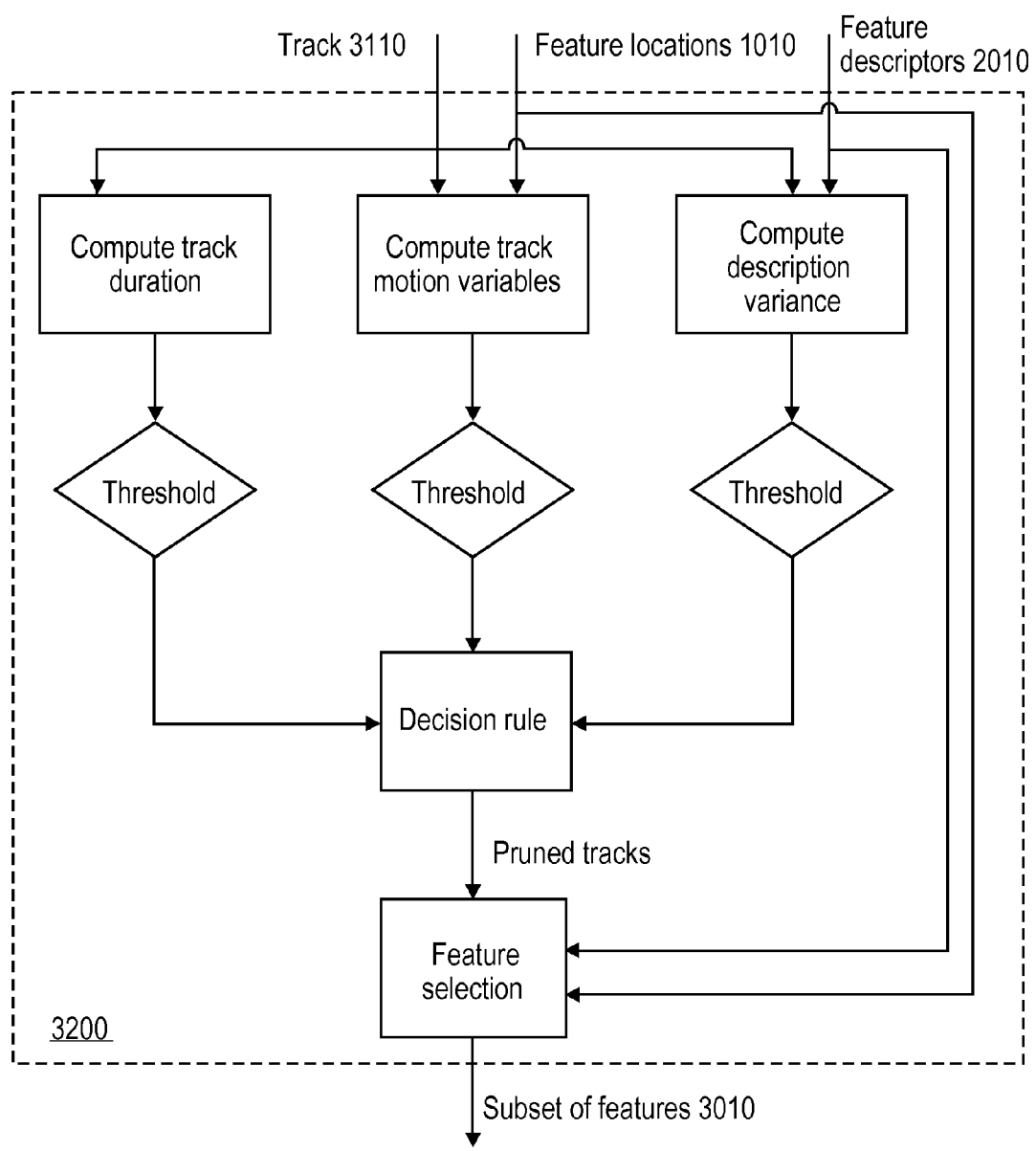
FIG. 19 is a flow diagram showing an embodiment of a procedure for feature track pruning.

One of the embodiments of feature pruning based on tracking previously shown in FIG. 18 (block 3200) is shown in more detail in FIG. 19. Inputting the feature locations 1010, corresponding feature descriptors 2010 and tracks of features 3110, for each track, the track duration "d", motion variance "mv" and descriptor variance "dv" are computed. These values go through a set of thresholds and a decision rule, rejecting tracks with too small duration and too large variance. The results is a subset of features 3010 belonging to tracks that survived the pruning.

One of the possible decision rules leaving the track is expressed as:

(d>th_d) AND (mv<th_mv) AND (dv<th_dv), where th_d is a duration threshold, th_mv is the motion variance threshold, and th_dv is the descriptor variance threshold.

Feature representation (FIG. 15, block 4000): Returning to FIG. 15, block 4000 shows the features on tracks remaining after pruning undergo representation using a visual vocabulary. The result of this stage is a set of visual atoms 4010. The visual vocabulary is a collection of K representative feature descriptors (visual elements), denoted here by $\{e_l\}_{l=1}^K$. The visual vocabulary can be pre-computed, for example, by collecting a large number of features in a set of representative video sequences and performing vector quantization on their descriptors. In different embodiments, values of K=1000, 2000, 3000, . . . , 1000000 are used.

Each feature i is replaced by the number l of the element from the visual vocabulary which is the closest to the descriptor of feature i. In one of the embodiments, a nearest neighbor algorithm is used to find the representation of feature i, $$l = \arg\min_{l=1,\ldots,K} \|f_i - e_l\|,$$

where $\|\bullet\|$ is a norm in the descriptor space. In another embodiment, an approximate nearest neighborhood algorithm is used. As a result, feature i is represented as $(x_i, y_i, l_i)$, referred to as a visual atom.

In one embodiment, prior to representation of feature in a visual vocabulary, for each track a representative feature is found. It can be obtained by taking a mean, median or majority vote of the descriptors of the features along a track. In one of the embodiments, non-discriminative features are pruned. A non-discriminative feature is such a feature which is approximately equally distant from multiple visual atoms. Such features can be determined by considering the ratio between the distance from the first and second closest neighbor.

Visual atom aggregation (6000): For each temporal interval computed at FIG. 15 block 5000, the visual atoms within it are aggregated into visual nucleotides. The resulting sequence of visual nucleotides (video DNA 6010) is the output of the process. A visual nucleotide s is created as a histogram with K bins (K being the visual vocabulary size), nth bin counting the number of visual atoms of type n appearing in the time interval.

In one embodiment, the histogram in the interval $[t_s, t_e]$ is weighted by the temporal location of a visual atom within an interval according to the formula $$h_n = \sum_{i:l_i=n} w(t_i - t_s)$$

where w(t) is a weight function, and $h_n$ is the value of the nth bin in the histogram. In one embodiment, the weight is set to its maximum value in the center of the interval, decaying towards interval edges, e.g. according to the Gaussian formula $$w(t) = \exp\left(-\frac{t^2}{2\sigma^2(t_e - t_s)^2}\right).$$

In another embodiment, shot cuts withing the interval $[t_s, t_e]$ are detected, and w(t) is set to zero beyond the boundaries of the shot to which the center $\frac{1}{2}(t_s+t_e)$ of the interval belongs.

In a particular embodiment, the bins of the histogram are further weighted in order to reduce the influence of unreliable bins. For example, the weight of the nth bin is inversely proportional to the typical frequency of the visual atom of type n. This type of weighting is analogous to inverse document frequency (tf-idf) weighting in text search engines.

In another embodiment, the weight of the nth bin is inversely proportional to the variance of the nth bin computed on representative under typical mutations and directly proportional to the variance of the nth bin on the same content.

Once the video DNA has been computed for at least two video sequences, these different video sequences can then be matched (aligned) as to time, as described below. In one embodiment, the temporal correspondence between the query video DNA represented as the sequence $\{q_i\}_{i=1}^M$ of visual nucleotides, and a video DNA from the database represented as the sequence $\{s_j\}_{j=1}^N$ of visual nucleotides is computed in the following way.

In a matching between the two sequences, a nucleotide $q_i$ is brought into correspondence either with a nucleotide $s_j$, or with a gap between the nucleotides $s_j$ and $S_{j+1}$, and, similarly, a nucleotide $s_j$ is brought into correspondence either with a nucleotide $q_i$, or with a gap between the nucleotides $q_i$ and $q_{i+1}$. A matching between $\{q_i\}_{i=1}^{M}$ and $\{s_j\}_{j=1}^{N}$ can be therefore represented as a sequence of K correspondences $\{(i_k, j_k)\}_{k=1}^{K}$, a sequence of G gaps $\{(i_m, j_m, l_m)\}_{m=1}^{G}$, where $(i_m, j_m, l_m)$ represents the gap of length $l_m$ between the nucleotides $s_{j_m}$ and $s_{j_m+1}$, to which the sub-sequence $\{q_{i_m}, q_{i_m+1}, \ldots, q_{i_m l_m}\}$ corresponds, and a sequence of G'gaps $\{(i_n, j_n, l_n)\}_{n=1}^{G'}$, where $(i_n, j_n, l_n)$ represents the gap of length $l_n$ between the nucleotides $q_{i_n}$ and $q_{j_n+1}$, to which the sub-sequence $\{s_{j_n}, s_{j_n+1}, \ldots, s_{j_n l_n}\}$ corresponds. A match is assigned a score according to the formula $$S = \sum_{k=1}^{K} \sigma(q_{i_k}, s_{j_k}) + \sum_{m=1}^{G} g(i_m, j_m, l_m) + \sum_{n=1}^{G'} g(i_n, j_n, l_n)$$

where $\sigma(q_{i_k}, s_{j_k})$ quantifies the score of the nucleotide $q_{i_k}$ corresponding to the nucleotide $S_{j_k}$ and $g(i_m, j_m, l_m)$ is the gap penalty.

As previously discussed, many alternative algorithms may be used to compute matching, ranging from simple to extremely complex. In one embodiment of the invention, the Needleman-Wunsch algorithm is used to find the matching by maximizing the total score S. In another embodiment, the Smith-Waterman algorithm is used. In yet another embodiment, the BLAST algorithm is used.

In an alternate embodiment, the matching maximizing the total score S is done in the following way. In the first stage, good matches of a small fixed length W between the query and sequence in the database are searched for. These good matches are known as seeds. In the second stage, an attempt is made to extend the match in both directions, starting at the seed. The ungapped alignment process extends the initial seed match of length W in each direction in an attempt to boost the alignment score. Insertions and deletions are not considered during this stage. If a high-scoring un-gapped alignment is found, the database sequence passes on to the third stage. In the third stage, a gapped alignment between the query sequence and the database sequence can be performed using the Smith-Waterman algorithm.

In one embodiment of the invention, the gap penalty is linear, expressed by $g(i_m, j_m, l_m) = \alpha l_m$ where $\alpha$ is a parameter. In another embodiment, the gap penalty is affine, expressed by $g(i_m, j_m, l_m) = \beta + \alpha(l_m - 1)$ where $\beta$ is another parameter.

In an embodiment, the score function $\sigma(q_{i_k}, s_{j_k})$ describes the similarity between the histogram h representing the nucleotide $q_{i_k}$ and the histogram h' representing the nucleotide $s_{j_k}$. In another embodiment, the similarity is computed as the inner product $\langle h, h' \rangle$. In alternate embodiments, the inner product is weighted by a vector of weight computed from training data to maximize the discriminative power of the score function. Alternatively, the score function $\sigma(q_{i_k}, s_{j_k})$ is inversely proportional to the distance between the histogram h representing the nucleotide $q_{i_k}$ and the histogram h' representing the nucleotide $s_{j_k}$. In other embodiments, the distance is computed as the Lp norm $$\|h - h'\|_p = \left( \sum_n (h_n - h'_n)^p \right)^{1/p}.$$

In a specific embodiment, the distance is the Kullback-Leibler divergence between the histograms. In other embodiments, the distance is the earth mover's distance between the histograms.

In a particular implementation, the score function $\sigma(q_{i_k}, s_{j_k})$ is proportional to the probability of a nucleotide $s_{j_k}$ mutating into a nucleotide $q_{i_k}$ by a spatial or temporal distortion applied to the underlying video sequence. This, in turn, can be expressed as the probability of the histogram h representing the nucleotide $q_{i_k}$ being the mutation of the histogram h' representing the nucleotide $s_{j_k}$.

In one example, the probability is estimated as $$P(h | h') = \prod_n P(h_n | h'_n),$$

where $P(h_n | h'_n)$ is the probability that the nth bin of the histogram h' changes its value to $h_n$. The probabilities $P(h_n | h'_n)$ are measured empirically on the training data, independently for each bin.

In another example, the Bayes theorem is used to represent the score function $\sigma(q_{i_k}, s_{j_k})$ as the probability $$P(h' | h) = \frac{P(h | h') P(h')}{P(h)}$$

where $P(h|h')$ is computed as explained previously, and $P(h)$ and $P(h')$ are expressed as $$P(h) = \prod_n P_n(h_n)$$

$$P(h') = \prod_n P_n(h'_n)$$

where $P_n(h_n)$ measures the probability of the nth bin of the histogram h assuming the value of $h_n$, and is estimated empirically from the training data, independently for each bin.

Often it is useful not only to find the overall frame or time alignment between two different videos, but also to find the alignment between a first "thing" (group of pixels) in one spatial alignment in one video, and a second corresponding "thing" with a second spatial alignment in a second video. Alternatively, sometimes it is useful to compare videos that have been taken with different orientations and resolutions. For example, a user photographing a television screen using a handheld video taken with a cell phone may wish to determine exactly what television show or movie was being played. In both cases, it is useful to determine the spatial alignment between two different videos, as well as the time (frame number) alignment.

In one embodiment of the present invention, the spatial correspondence between the visual nucleotide $q_i$ representing the temporal interval $[t_s, t_e]$ in the query sequence, and the best matching visual nucleotide $s_j$ representing the temporal interval $[t'_s, t'_e]$ in the database sequence is computed in the following way.

In this embodiment, a frame is picked out of the interval $[t_s, t_e]$ and represented as a set of features $\{x_i, y_i\}_{i=1}^{N}$ with the corresponding descriptors $\{f_i\}_{i=1}^{N}$. Another frame is picked out of the interval $[t'_s, t'_e]$ and represented as a set of features $\{x'_j, y'_j\}_{j=1}^{N'}$ with the corresponding descriptors $\{f'_j\}_{j=1}^{N'}$. A correspondence is found between the two sets in such a way that each $f_i$ is matched to the closest $f'_j$. Insufficiently close matches are rejected. The corresponding points are denoted by $\{x_{i_k}, y_{i_k}\}, \{x'_{j_k}, y'_{j_k}\}$.

Once this correspondence is found, a transformation T is found by minimizing $$\min_T \|T(x_{i_k}, y_{i_k}) - (x'_{j_k}, y'_{j_k})\|.$$

In one embodiment, the minimization is performed using a RANSAC (random sample consensus) algorithm. In another embodiment, the minimization is performed using the iteratively-reweighted least squares fitting algorithm. Often it will be useful to perform rotation, size, or distortion transformations.

In one of the embodiments, the transformation T is of the form $$T = \begin{pmatrix} \cos\theta & \sin\theta & u \\ -\sin\theta & \cos\theta & v \\ 0 & 0 & 1 \end{pmatrix}.$$

In another embodiment, the transformation T is of the form $$T = \begin{pmatrix} \cos\theta & \sin\theta & u \\ -\alpha\sin\theta & \alpha\cos\theta & v \\ 0 & 0 & 1 \end{pmatrix}.$$

In another embodiment, the transformation T is of the form $$T = \begin{pmatrix} a & b & u \\ c & d & v \\ 0 & 0 & 1 \end{pmatrix}.$$

In another embodiment, the transformation T is a projective transformation.

Figure 20:
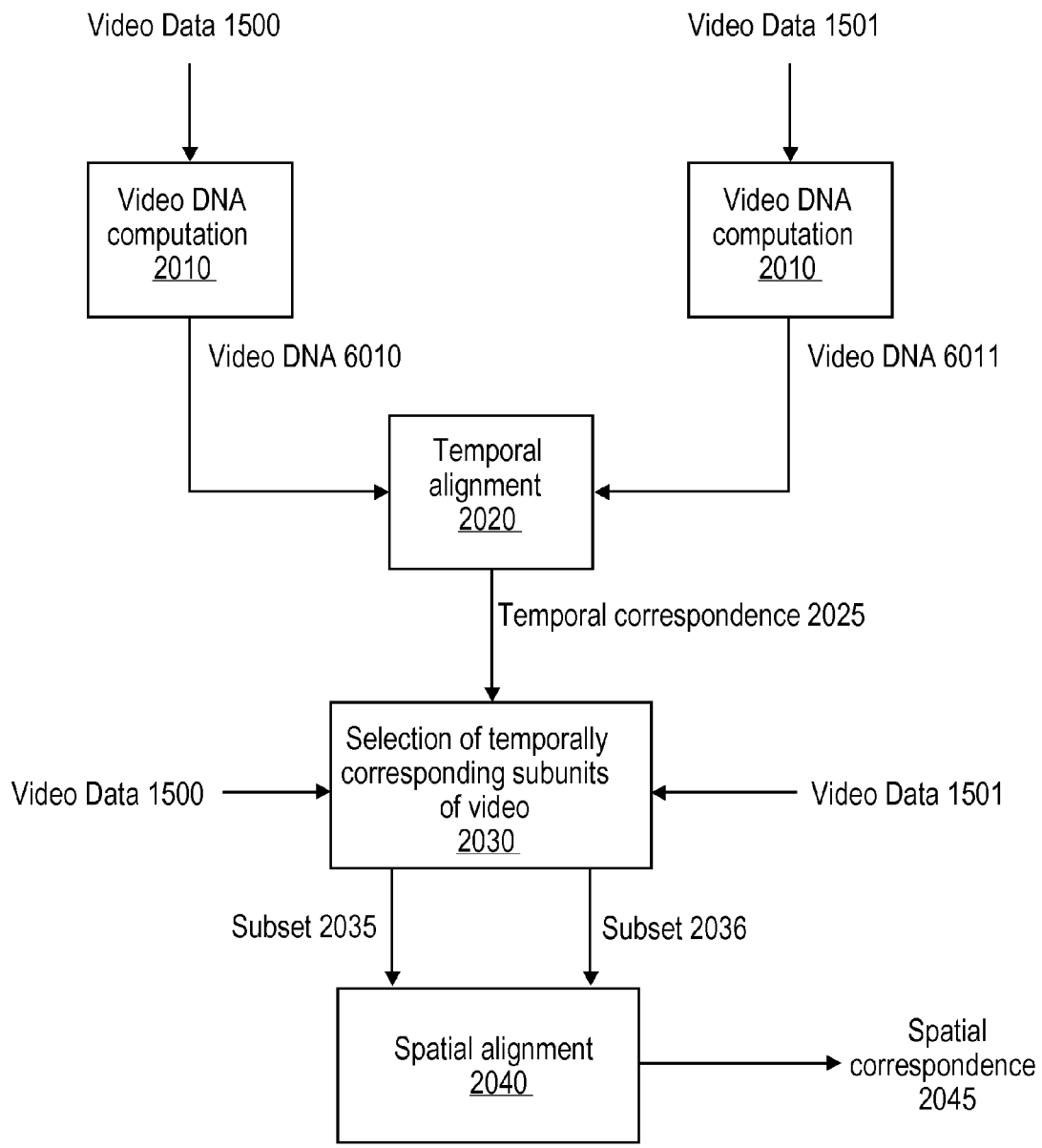
FIG. 20 is a flow diagram showing an embodiment of a procedure for finding spatio-temporal correspondence between two video DNA sequences.

Finding of spatio-temporal correspondence between two sequences is depicted in FIG. 20. The process consists of the following stages:

1. Video DNA computation. Two sets of video data 900 and 901 are inputted into a video DNA computation stage 2010. Stage 2010 was shown in more detail in FIG. 15 as steps 1000, 2000, 3000 and 4000. This stage can be performed on-line, or pre-computed and stored.

2. Temporal matching. The resulting video DNAs 6010 and 6011 are inputted into a temporal alignment stage 2020, which computes a temporal correspondence 2025. The temporal correspondence is essentially a transformation from the temporal system of coordinates of the video data 900, and that of the video data 901.

3. Spatial matching. The temporal correspondence 2025 is used at stage 2030 of selection of temporally corresponding subsets of the video data 900 and 901. The selected subsets 2035 and 2036 of the video data 900 and 901, respectively, are inputted to a spatial alignment stage 2040, which computes a spatial correspondence 2045. The spatial correspondence is essentially a transformation from the spatial system of coordinates of the video data 900, and that of the video data 901.

A particular example is discussed below, in which the video DNA of an input video sequence is computed as depicted in FIG. 15. The process of video DNA computation inputs video data 900 and includes the following stages: feature detection 1000, feature description 2000, feature pruning 3000, feature representation 4000, segmentation into temporal intervals 5000 and visual atom aggregation 6000. The output of the process is a video DNA 6010.

Feature detection 1000: A SURF feature detector (described in "Speeded Up Robust Features", Proceedings of the 9th European Conference on Computer Vision, May 2006) is operated independently on each frame of the video sequence 900, producing a set of $N_f=150$ strongest invariant feature point locations (denoted by 1010 in FIG. 15) per each frame "t".

Feature description 2000: For each feature point detected at feature detection stage 1000, a 64-dimensional SURF feature descriptor is computed, as described in described in "Speeded Up Robust Features", Proceedings of the 9th European Conference on Computer Vision, May 2006.

Feature pruning 3000: This is an optional step which is not performed in this example.

Feature representation 4000: The features are represented in a visual vocabulary consisting of K=1000 entries. The representative elements are computed using the approximate nearest neighbor algorithm described in S. Arya and D. M. Mount, "Approximate Nearest Neighbor Searching", Proc. 4th Ann. ACM-SIAM Symposium on Discrete Algorithms (SODA'93), 1993, 271-280. Only features whose distance to the nearest neighbor is below 90% of the distance to the second nearest neighbor are kept. The result of this stage is a set of visual atoms 4010.

The visual vocabulary for the feature representation stage is pre-computed from a sequence of 750,000 feature descriptors obtained by applying the previously described stages to a set of assorted visual context serving as the training data. A k-means algorithm is used to quantize the training set into 1000 clusters. In order to alleviate the computational burden, the nearest neighbor search in the k-means algorithm is replaced by its approximate variant as described in S. Arya and D. M. Mount, "Approximate Nearest Neighbor Searching", Proc. 4th Ann. ACM-SIAM Symposium on Discrete Algorithms (SODA'93), 1993, 271-280.

Segmentation into temporal intervals 5000: The video sequence is divided into a set of fixed temporal intervals of fixed duration of 1 sec, (see FIG. 16, reference numeral 1620).

Visual atom aggregation 6000: For each temporal interval computed at stage 5000, the visual atoms within it are aggregated into visual nucleotides. The resulting sequence of visual nucleotides (video DNA 6010) is the output of the process. A visual nucleotide is created as a histogram with K=1000 bins, nth bin counting the number of visual atoms of type n appearing in the time interval.

After the video DNA for two different or more different videos is produced, the video DNA from these materials may then be checked for correspondence, and matched as follows:

Temporal matching (see FIG. 20, reference numeral 2020) can be performed using the SWAT (Smith-Waterman) algorithm with an affine gap penalty with the parameters $\alpha=5$ and $\beta=3$. The weighted score function $$\sigma(h, h') = \frac{\sum_{n=1}^{1000} h_n w_n h'_n}{\sqrt{\sum_{n=1}^{1000} w_n(h_n)^2} \sqrt{\sum_{n=1}^{1000} w_n(h'_n)^2}}$$

is used.

The weights $w_n$ can be computed empirically. For that purpose, various training video sequences can be transformed using a set of random spatial and temporal deformations, including blurring, resolution, aspect ratio, and frame rate changes, and its video DNA can be computed. The variance of each bin in the visual nucleotides, as well as the variance each bin in the corresponding visual nucleotides under the deformations are estimated. For each bin n, the weight $w_n$ is set to be ratio between the latter two variances.

Spatial matching (see FIG. 20, reference numeral 2040): The spatial alignment can be done between two 1 sec corresponding intervals of features representing the two sets of video data 900 and 901, where the correspondence is obtained from the previous temporal alignment stage 2020. For each feature in one interval, the corresponding feature in the other interval is found by minimizing the Euclidean distance between their respective descriptors. The output of the process is two sets of corresponding features $\{(x_i, y_i, t_i)\}$, $\{(x'_i, y'_i, t'_i)\}$ Once the correspondence is found, a transformation of the form $$T = \begin{pmatrix} a & b & u \\ -b & c & v \\ 0 & 0 & 1 \end{pmatrix}$$

can be found between the corresponding sets using the RANSAC algorithm.

Another way to view the at least one aspect of the invention is that it is a method of spatio-temporal matching of digital video data that includes multiple temporally matching video frames. In this view, the method consists of the steps of performing temporal matching on the digital video data that includes the plurality of temporally matching video frames to obtain a similarity matrix, where the spatial matching represents each of the video frames using a representation that includes a matching score, a similarity component, and a gap penalty component, and the representation is operated upon using a local alignment algorithm (such as one based upon a bioinformatics matching algorithm, or other suitable algorithm); and performing spatial matching on the digital video data that includes the plurality of temporally matching video frames obtained using the similarity matrix. Here the step of performing spatial matching is substantially independent from the step of performing temporal matching.

The above method could use a Needleman-Wunsch algorithm, a Smith-Waterman algorithm or similar type of algorithm. The above method can be also be implemented with a bioinformatics matching algorithm such as a basic local alignment search tool used to compare biological sequences or a protein or nucleotides DNA sequencing like algorithm.

The above method may further include performing local feature detection on the digital video data that includes the plurality of temporally matching video frames to detect points of interest; and using the points of interest to segment the digital video data that includes the plurality of temporally matching video frames into a plurality of temporal intervals; and wherein the step of performing temporal matching and performing spatial matching operate upon the plurality of temporal intervals.

In another aspect, the method may determine spatio-temporal correspondence between video data, and include steps such as: inputting the video data; representing the video data as ordered sequences of visual nucleotides; determining temporally corresponding subsets of video data by aligning sequences of visual nucleotides; computing spatial correspondence between temporally corresponding subsets of video data; and outputting the spatio-temporal correspondence between subsets of the video data.

Types of input data: With respect to this other aspect the video data may be a collection of video sequences, and can also be query of video data and corpus video data, and can also comprise subsets of a single video sequence or modified subsets of a video sequence from the corpus video data. Still further, the spatio-temporal correspondence can be established between at least one of the subsets of at least one of the video sequences from the query video data and at least one of subsets of at least one of the video sequences from the corpus video data. In a specific implementation, the spatio-temporal correspondence can be established between a subset of a video sequence from the query video data and a subset of a video sequence from the corpus video data.

With respect to the query video data mentioned above, the query can contain modified subsets of the corpus video data, and the modification can be a combination of one or more of the following frame rate change;
spatial resolution change;
non-uniform spatial scaling;
histogram modification;
cropping;
overlay of new video content;
temporal insertion of new video content.

Nucleotide segmentation: In another variation, the described systems and methods can also have the video data which are segmented into temporal intervals, and one visual nucleotide can be computed for each interval.

Interval duration: In another variation, the described systems and methods can also segment the video data into temporal intervals of constant duration or temporal intervals of variable duration. Temporal interval start and end times can also be computed according to the shot transitions in the video data. It is also noted that the temporal intervals may be non-overlapping or overlapping.

Visual nucleotide computation: In another variation, the visual nucleotide (the term used, as mentioned previously, to describe the visual content in a temporal interval of the video data) can also be computed using the following steps:

representing a temporal interval of the video data as a collection of visual atoms;
constructing the nucleotide as a function of at least one of the visual atoms.

With respect to this computation, the function may be a histogram of the appearance frequency of the features (visual atoms) in the temporal interval, or the function may be a weighted histogram of the appearance frequency of visual atoms in the temporal interval. If a weighted histogram, then the weight assigned to a visual atom can be a function of a combination of the following:

the temporal location of the visual atom in the temporal interval;
the spatial location of the visual atom in the temporal interval;
the significance of the visual atom.

Relative weight of different features or visual atoms in the nucleotide or "bag of features": In one implementation, the weight is constant over the interval (i.e., all features are treated the same). However in other implementations, the features may not all be treated equally. For example, in an alternative weighting scheme, the weight can be a Gaussian function with the maximum weight being inside the interval. The weight can also be set to a large value for the visual content belonging to the same shot as the center of the interval, and to a small value for the visual content belonging to different shots. Alternatively, the weight can be set to a large value for visual atoms located closer to the center of the frame, and to a small value for visual atoms located closer to the boundaries of the frame.

Visual atom methods: As described previously, the visual atom describes the visual content of a local spatio-temporal region of the video data. In one implementation, representing a temporal interval of the video data as a collection of visual atoms can include the following steps:

- detecting a collection of invariant feature points in the temporal interval;
- computing a collection of descriptors of the local spatio-temporal region of the video data around each invariant feature point;
- removing a subset of invariant feature points and their descriptors;
- constructing a collection of visual atoms as a function of the remaining invariant feature point locations and descriptors.

Feature detection methods: In addition to the feature detection methods previously described, the collection of invariant feature points in the temporal interval of the video data mentioned above may be computed using the Harris-Laplace corner detector or using the affine-invariant Harris-Laplace corner detector or using the spatio-temporal corner detector or using the MSER algorithm. If the MSER algorithm is used, it can be applied individually to a subset of frames in the video data or can be applied to a spatio-temporal subset of the video data. The descriptors of the invariant feature points mentioned above can also be SIFT descriptors, spatio-temporal SIFT descriptors, or SURF descriptors.

Tracking methods: In some embodiments, computing a collection of descriptors mentioned above can include: tracking of corresponding invariant feature points in the temporal interval of the video data, using methods such as:

- computing a single descriptor as a function of the descriptors of the invariant feature points belonging to a track;
- assigning the descriptor to all features belonging to the track.

This computing the function may be the average of the invariant feature points descriptors or the median of the invariant feature points descriptors.

Feature pruning methods: In some embodiments, removing a subset of invariant feature points as mentioned above can include:

- tracking of corresponding invariant feature points in the temporal interval of the video data;
- assigning a quality metric for each track;
- removing the invariant feature points belonging to tracks whose quality metric value is below a predefined threshold.

In some embodiments, the quality metric assigned for a track as mentioned above may be a function of a combination of the following

- descriptor values of the invariant feature points belonging to the track;
- locations of the invariant feature points belonging to the track.

The function may be proportional to the variance of the descriptor values or to the total variation of the invariant feature point locations.

Visual atom construction: In some embodiments, constructing a collection of visual atoms mentioned above may also be performed by constructing a single visual atom for each of the remaining invariant feature points as a function of the invariant feature point descriptor. The function computation may include:

- receiving an invariant feature point descriptor as the input;
- finding a representative descriptor from an ordered collection of representative descriptors matching the best the invariant feature point descriptor received as the input;
- outputting the index of the found representative descriptor.

Finding a representative descriptor may be performed using a vector quantization algorithm or using an approximate nearest neighbor algorithm.

Visual vocabulary methods: The ordered collection of representative feature descriptors (visual vocabulary) may be fixed and computed offline from training data, or may be adaptive and updated online from the input video data. In some cases, it will be useful to construct a standardized visual vocabulary that operates either universally over all video, or at least over large video domains, so as to facilitate standardization efforts for large video libraries and a large array of different video sources.

Visual atom pruning methods: In some embodiments, constructing the collection of visual atoms mentioned above may be followed by removing a subset of visual atoms, and removing a subset of visual atoms may include:

- assigning a quality metric for each visual atom in the collection;
- removing the visual atoms whose quality metric value is below a predefined threshold.

The threshold value may be fixed or adapted to maintain a minimum number of visual atoms in the collection or adapted to limit the maximum number of visual atoms in the collection. Further, the assigning the quality metric may include:

- receiving a visual atom as the input;
- computing a vector of similarities of the visual atom to visual atoms in a collection of representative visual atoms;
- outputting the quality metric as a function of the vector of similarities. This function may be proportional to the largest value in the vector of similarities, proportional to the ratio between the largest value in the vector of similarities and the second-largest value in the vector of similarities or a function of the largest value in the vector of similarities and the ratio between the largest value in the vector of similarities and the second-largest value in the vector of similarities.

Sequence alignment methods: In some embodiments, the aligning sequences of visual nucleotides mentioned above may include

- receiving two sequences of visual nucleotides $S=\{s_1, \ldots, s_M\}$ and $q=\{q_1, \ldots, q_M\}$ as the input;
- receiving a score function $\sigma(s_i, q_j)$ and a gap penalty function $\gamma(i, j, n)$ as the parameters;
- finding the partial correspondence $C=\{(i_1, j_1), \ldots, (i_K, j_K)\}$ and the collection of gaps $G=\{(l_1, m_1, n_1), \ldots, (l_L, m_L, n_L)\}$ maximizing the functional $$F(C, G) = \sum_{k=1}^{K} \sigma(s_{i_k}, q_{j_k}) + \sum_{k=1}^{L} \gamma(l_k, m_k, n_k)$$

- outputting the found partial correspondence C and the maximum value of the functional.

Other alignment methods: As previously discussed, the maximization may be performed using the Smith-Waterman algorithm, the Needleman-Wunsch algorithm, the BLAST algorithm or may be performed in a hierarchical manner.

Scoring methods: The score function mentioned above may be a combination of one or more functions of the form $$s_i^T A q_j;$$

$$\frac{s_i^T A q_j}{\sqrt{s_i^T A s_i} \sqrt{q_j^T A q_j}}.$$

wherein A may be an identity matrix, a diagonal matrix.

The score may also be proportional to the conditional probability $P(q_j|s_i)$ of the nucleotide $q_j$ being a mutation of the nucleotide $s_i$ and the mutation probability may be estimated empirically from training data.

The score may also be proportional to the ratio of probabilities $$\frac{P(q_j|s_i)P(s_i)}{P(q_j)}$$

and the mutation probability may be estimated empirically from training data.

Distance based scoring methods: Further, the score function may be inversely proportional to a distance function $d(s_i, q_j)$, and the distance function may be a combination of at least one of the following
L1 distance;
Mahalanobis distance;
Kullback-Leibler divergence;
Earth Mover's distance.

Weighting schemes: In addition to the weighting schemes previously described, the diagonal elements of the matrix A may be proportional to $$\log \frac{1}{E_i}$$

where $E_i$ denotes the expected number of times that a visual atom i appears in a visual nucleotide. $E_i$ may be estimated from training video data or from the input video data. And the diagonal elements of the matrix A may be proportional to $$\frac{v_i}{V_i}$$

where $v_i$ is the variance of the visual atom i appearing in mutated versions of the same visual nucleotide, and $V_i$ is the variance of the visual atom i appearing in any visual nucleotide. Further, $v_i$ and $V_i$ may be estimated from training video data.

Gap penalty methods: In some embodiments, the gap penalty can be a parametric function of the form $\gamma(i, j, n; \theta)$, where i and j are the starting position of the gap in the two sequences, n is the gap length, and $\theta$ are parameters. The parameters may be estimated empirically from the training data, and the training data may consist of examples of video sequences with inserted and deleted content. Further, the gap penalty may be a function of the form: $\gamma(n)=a+bn$, where n is the gap length and a and b are parameters. Still further, the gap penalty may be a convex function or inversely proportional to the probability of finding a gap of length n starting at positions i and j in the two sequences.

Spatial correspondence methods: Methods of computing spatial correspondence may include:
inputting temporally corresponding subsets of video data;
providing feature points in subsets of video data;
finding correspondence between feature points;
finding correspondence between spatial coordinates.

Temporally corresponding subsets of video data may be at least one pair of temporally corresponding frames. Further, finding correspondence between feature points further may include:
inputting two sets of feature points;
providing descriptors of feature points;
matching descriptors;

The feature points may be the same as used for video nucleotides computation, and the descriptors may be the same as used for video nucleotides computation.

Also, finding correspondence between feature points may be performed using a RANSAC algorithm or consist of finding parameters of a model describing the transformation between two sets of feature points, wherein finding parameters of a model may be performed by solving the following optimization problem $$\theta^* = \arg \min_{\theta} T(\{(x_i, y_i)\}, \{(x_j, y_j)\}; \theta)$$

where $\{(x_i, y_i)\}$ and $\{(x_j, y_j)\}$ are two sets of feature points and T is a parametric transformation between sets of points depending on parameters $\theta$.

The correspondence between spatial coordinates may be expressed as a map between the spatial system of coordinates (x, y) in one subset of video data and spatial system of coordinates (x', y') in another subset of video data.

Output methods: the output spatio-temporal correspondence between subsets of video data may be represented as a map between the spatio-temporal system of coordinates (x, y, t) in one subset and spatio-temporal system of coordinates (x', y', t') in another subset.

Figure 21:
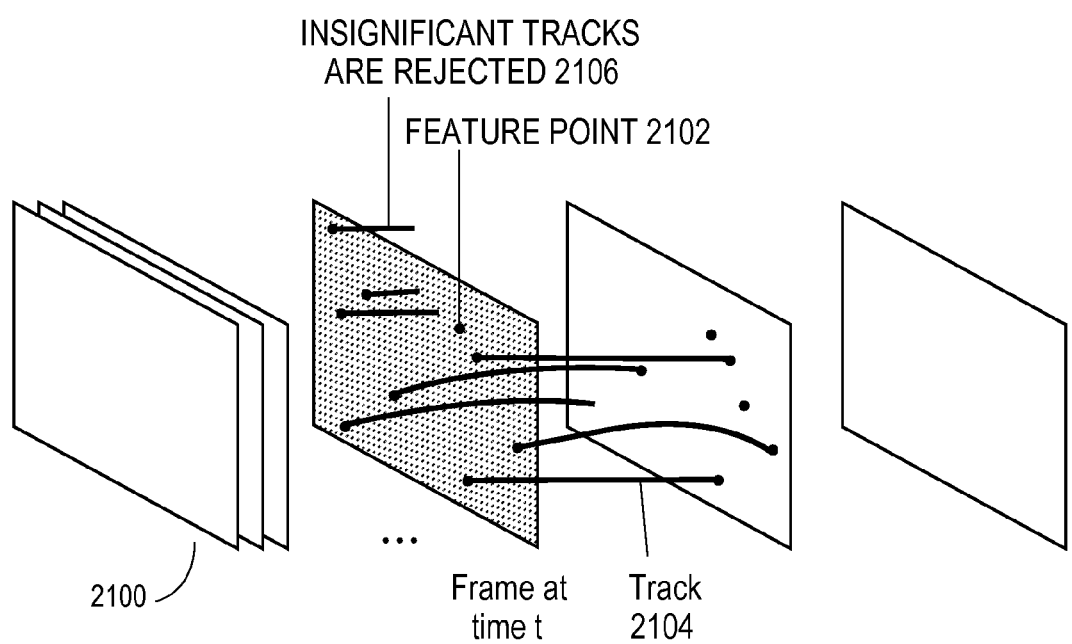
FIG. 21 shows an example overview of the video DNA generation process.

An example of the video DNA generation process is shown in FIG. 21. Here, a local feature detector is applied in a frame-wise manner to the various image frames of the video sequence (2100). This feature detector finds points of interest (2102), also referred to as "feature points", in the video sequence. As previously discussed, many different types of feature detectors may be used, including the Harris corner detector (C. Harris and M. Stephens "A combined corner and edge detector", Alvey Vision Conference, 1988), the Kanade-Lucas algorithm (B. D. Lucas and T. Kanade, "An iterative image registration technique with an application to stereo vision", 1981) SIFT scale-space based feature detectors (D. G. Lowe, Distinctive image features from scale-invariant keypoints, IJCV, 2004) and others. Generally, this feature detection algorithm is designed in such a way that the feature descriptors are robust or invariant to spatial distortions of the video sequence (e.g., change of resolution, compression noise, etc.). In order to reduce transient noise and focus on the most useful features, the features are often tracked over multiple frames (2104), and features that appear for too short a period are deleted or pruned (2106).

Figure 22:
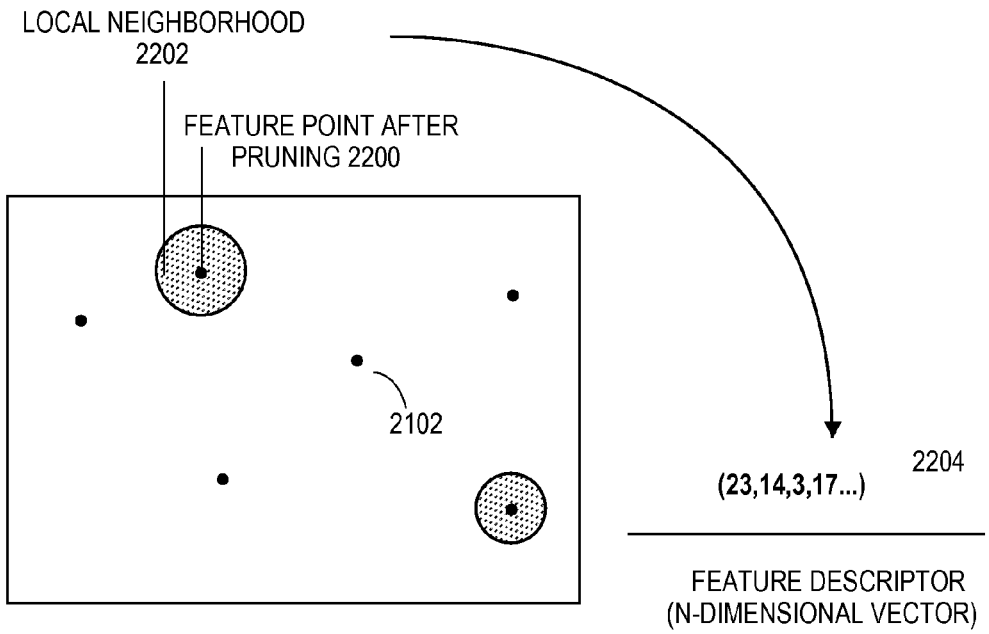
FIG. 22 shows an example of how video features are processed during video DNA generation.

The next stage of the video DNA generation process is shown in FIG. 22. Here FIG. 22 shows a detail of one video image frame, where the dots in the frame (2102) correspond to image features that have been detected. Here the feature points remaining after feature pruning (2200) are then described using a local feature descriptor. This feature descriptor generates a second type of vector that represents the local properties (local neighborhood) (2202) of the video frame around a feature point (2200). As previously discussed, many different algorithms can be used to describe the properties of the video image frame around a feature point. These algorithms can include a local histogram of edge directions, the scale invariant feature transform (SIFT), the speed up robust features (SURF) algorithm (H. Bay, T. Tuytelaars and L. van Gool, "Speed up robust features", 2006).

Mathematically, this feature descriptor can be represented as a second type of vector that describes the local properties of video image (2204) associated with each feature point. This second type of vector of values can correspond to many types of properties of the local neighborhood (2202) near the pruned feature point (2200). Some vector coefficients (2204) could correspond to the presence or absence of image edges at or near point (2200), others may correspond to the relative image brightness or color near point (2200), and so on. Thus a video DNA "nucleotide" or signature that describes a video "snippet" (short temporal series of video frames) contains two types of vectors: a first type of vector that tells how many different types of feature descriptors are in the snippet, and a second type of vector that is used to mathematically describe the properties of each of the individual feature descriptors.

In order to create a standardized process that can enable many different videos to be easily compared, rather than using descriptors that are unique to each segment of video, it is often desirable to create a standardized library of descriptors that can be used for many different videos, and do a best fit to "map", "bin", or "assign" the descriptors from any given video into this standardized library or "vocabulary".

Figure 23:
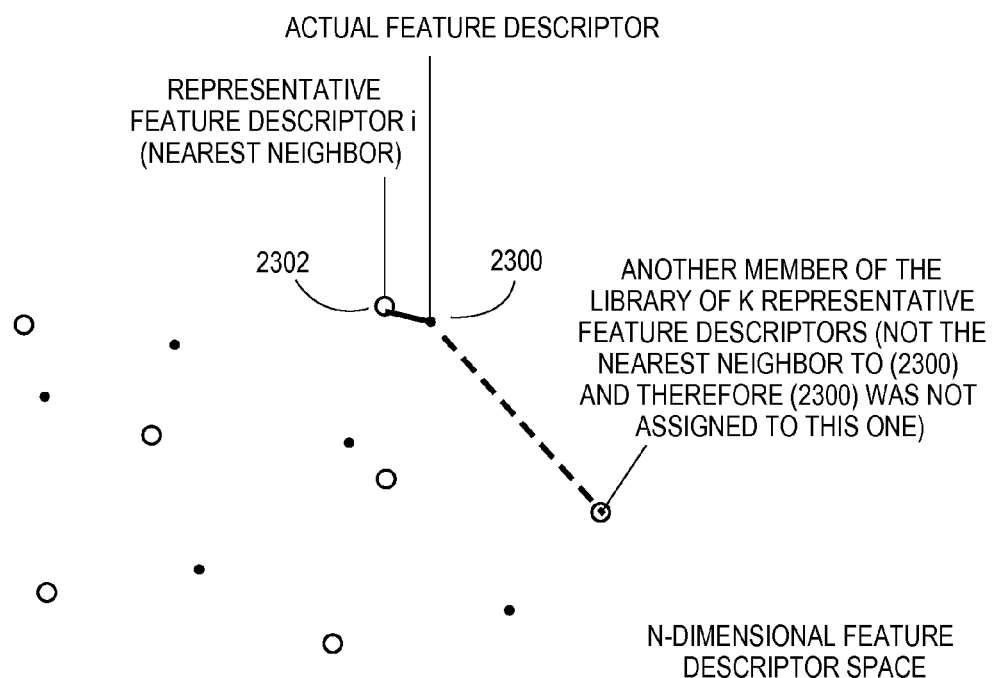
FIG. 23 show an example of how video feature descriptors are binned into a standardized library (visual vocabulary) of feature descriptors.

In FIG. 23, as previously discussed, the actual feature descriptors (2300) for the visual environment around each pruned feature point (FIG. 22, 2200) are then assigned to "bins" according to the "visual library" or "visual vocabulary" which is a pre-computed set of feature descriptor types. This visual vocabulary can be viewed as a standardized library of feature descriptors. Here, a finite set (usually around 1000 or more) of "ideal" representative feature descriptors is computed, and each "real" feature descriptor is assigned to whatever "ideal" feature descriptor in the "visual vocabulary" most closely matches the "real" feature descriptor. As a result, each "real" feature descriptor (2300) from the portion of the actual video is binned into (or is replaced by) the corresponding closest element in the visual vocabulary (2302), and only the index (i.e., the fact that this particular library feature descriptor had another closed neighbor) of the closest "ideal" or representative descriptor is stored, rather than the real descriptor (2300) itself.

From a nomenclature standpoint, features represented this way will occasionally be referred to in this specification as "visual atoms". As a rough analogy, the visual vocabulary can be viewed as a "periodic table" of visual atoms or elements. Continuing this analogy, the visual vocabulary can be thought of as a "periodic table" of visual elements.

Figure 24:
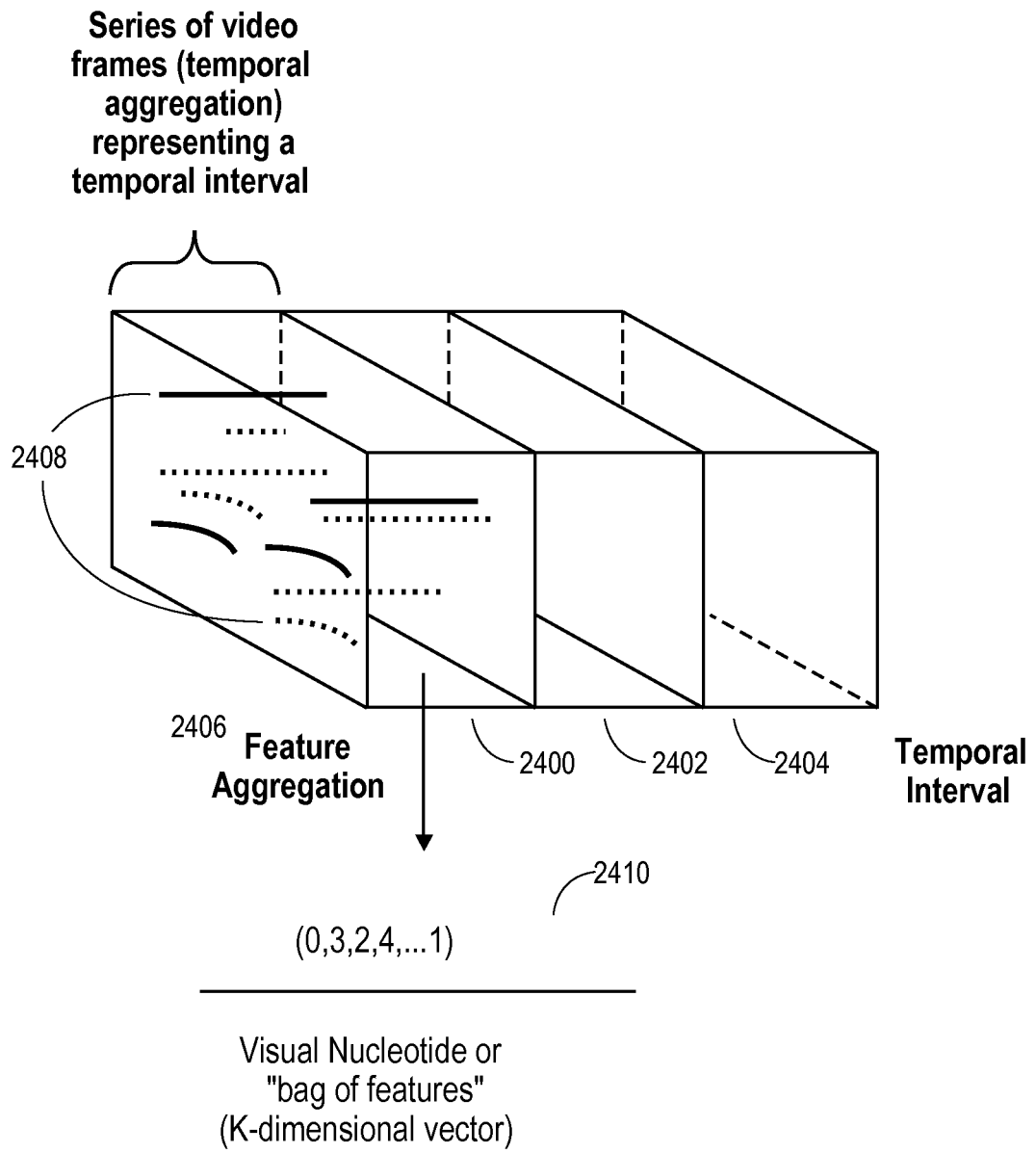
FIG. 24 shows an example of how video is segmented into various short multiple-frame intervals or "snippets" during the video DNA creation process.

FIG. 24 gives additional details showing how the original video is segmented into multiple-frame intervals (temporal segmentation). In this stage, the video sequence is segmented into various time (temporal) intervals or snippets (2400), (2402), (2404), etc. These intervals can be of fixed size (e.g., every 10 frames represents one interval), or of variable size, and can be either overlapping or non-overlapping. Often it will be convenient to track features, and segment the video into regions where the features remain relatively constant, which will often correspond to a particular cut or edit of a particular video scene. Such segmentation can be done, for example, based on the feature tracking from the previous stage. It should be noted that the segmentation is usually done automatically by a pre-determined algorithm.

Next, the now visual-vocabulary-binned visual feature descriptors (visual atoms) in each temporal interval are combined (aggregated) (2406). Here, the space and time coordinates of the features themselves (2408) are not used, rather it is the sum total of the different types of feature descriptors present in the series of video frames (temporal interval) that is used here. This process essentially ends up creating a histogram, vector, or "bag of feature (descriptors)" (2410) for each series of video frames. The frequency of appearance of the various binned feature descriptors (visual atoms) can be represented as a histogram or vector, and as used herein, this histogram or vector is occasionally referred to as a visual nucleotide.

This "bag of features" method of abstracting or indexing a video has a number of advantages. One advantage is that this method is robust, and can detect relationships between related videos even if one or both of the videos are altered by overlaying pixels over the original frames, spatially edited (e.g., cropped), changed to different resolutions or frame rates, and the like. For example, if one of the video sequences has been modified (e.g., by overlaying pixels over the original frames), the new video sequence will consist of a mixture of features (one set belonging to the original video and the other set belonging to the overlay). If the overlay is not very large (i.e., most of the information in the frame belongs to the original video), it is still possible to correctly match the two visual nucleotides from the two videos by adopting a relaxed matching criteria that determines that the nucleotides (histograms or vectors of features) match with less than 100% correspondence between the two.

Figure 25:
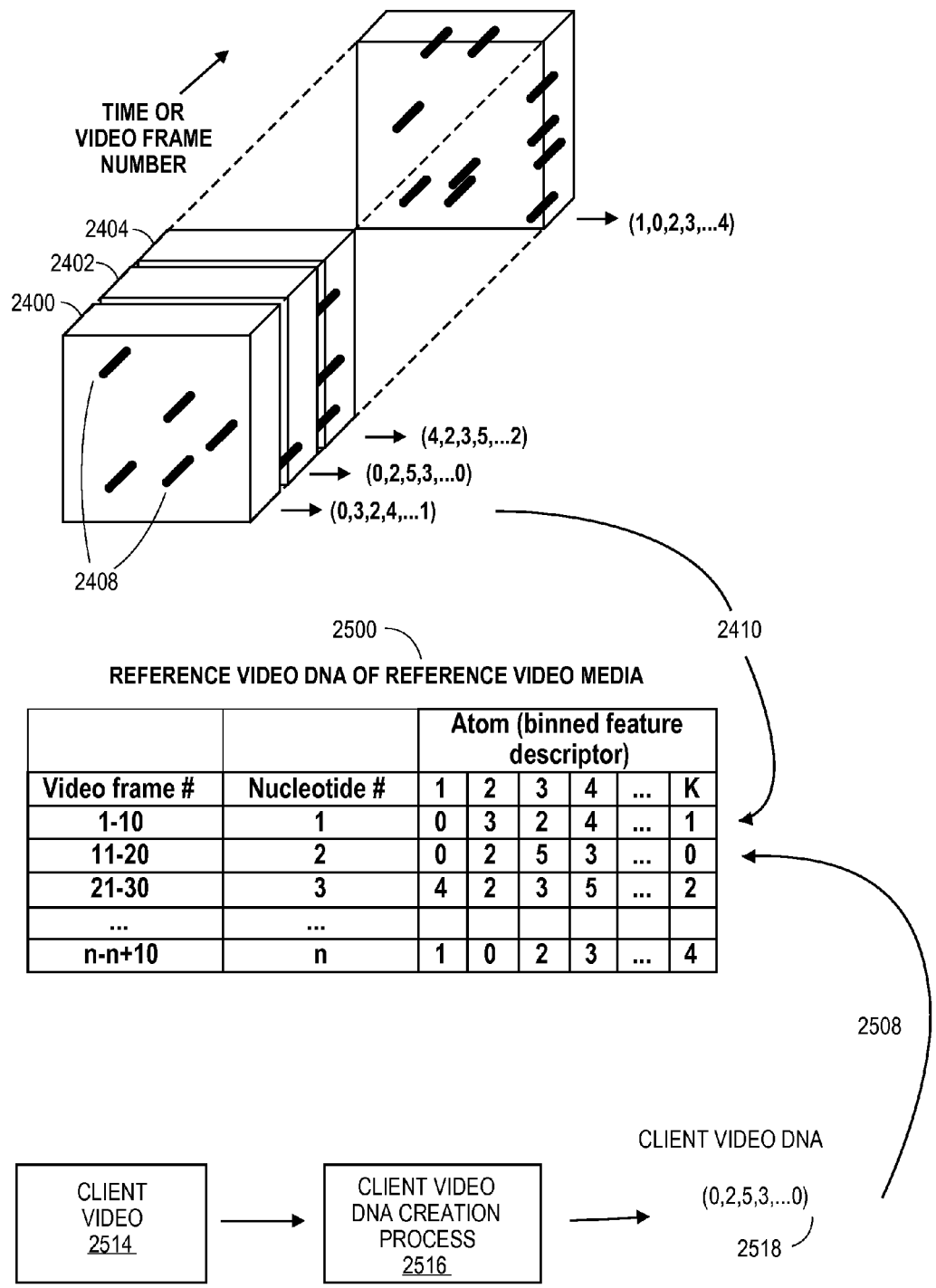
FIG. 25 shows an example of how a video can be indexed and described by its corresponding video DNA.

FIG. 25 shows an example formation of the video DNA for a particular media. Here, the video DNA consists of an ordered array or "sequence" of the different "histograms", "vectors of feature descriptors", or "nucleotides" taken from the various time segments (snippets) (2400), (2402), (2404), etc. of the video. Either video, that is either the original reference video intended for the metadata database on a server, or a client video which can be a copy of the original reference video, can be abstracted and indexed by this video DNA process, and generally the video DNA created from a reference video will be similar enough to the video DNA created by a client video so that one video DNA can be used as an index or match to find a correspondence with the other video DNA.

This reference video DNA creates an index that allows another device, such as a client about to play a client copy of the reference video, to locate the portion of the video that the client is about to play in the reference or server video DNA database. As an example, a client about to play a client video (2514) can compute (2516) the video DNA of the client video by the same video DNA process, send the video DNA signature of this client video DNA to the server or other device holding the reference video DNA, the position and nature of this series of video frames can be determined by using the client video DNA as an index into the server or reference video DNA database. This index in turn can be used to retrieve metadata from the server database that corresponds to the portion of video that is being played on the client.

As previously discussed, even when a relatively large array (i.e. hundreds or thousands) of different feature detection algorithms are used to analyze video images, not all image features will fit neatly into each different feature algorithm type. Some image features descriptors will either not precisely fit into a specific feature descriptor algorithm, or else will have an ambiguous fit. To improve the overall fidelity of the video DNA process, it is often useful to try use nearest neighbor algorithms to try to get the closest fit possible. In the nearest neighbor fit, the actual observed features (feature descriptors) are credited to the counter bin associated with the feature descriptor algorithm that most closely fits the observed feature descriptor.

The temporal matching of client-side and reference video DNAs can be performed using a variety of different algorithms. These algorithms can range from very simple "match/no match algorithms", to bioinformatics-like "dot matrix" algorithms, to very sophisticated algorithms similar to those used in bioinformatics for matching of biological DNA sequences. Examples of some of these more complex bioinformatics algorithms include the Needleman-Wunsch algorithm, described in S. B Needleman, C. D Wunsch, "A general method applicable to the search for similarities in the amino acid sequence of two proteins", 1970; Smith-Waterman algorithm, described in T. F. Smith and M. S. Waterman, "Identification of common molecular subsequences", 1981; and heuristics such as Basic Local Alignment Search Tool (BLAST), described in S. F. Alschul et al., "Basic Local Alignment Search Tool", 1990.

Often, a suitable sequence matching algorithm will operate by defining a matching score (or distance), representing the quality of the match between two video sequences. The matching score comprises two main components: similarity (or distance) between the nucleotides and gap penalty, expressing to the algorithm the criteria about how critical it is to try not to "tear" the sequences by introducing gaps.

In order to do this, the distance between a nucleotide in a first video and a corresponding nucleotide in a second video must be determined by some mathematical process. That is, how similar is the "bag of features" from the first series of frames of one video similar to the "bag of features" from a second series of frames from a second video? This similarity value can be expressed as a matrix measuring how similar or dissimilar the two nucleotides are. In a simple case, it can be a Euclidean distance or correlation between the vectors (bags of features) representing each nucleotide. If one wishes to allow for partial similarity (which frequently occurs, particularly in cases where the visual nucleotides may contain different features due to spatial edits), a more complicated metric with weighting or rejection of outliers can be used. More complicated distances may also take into consideration the mutation probability between two nucleotides: two different nucleotides are more likely similar if they are likely to be a mutation of each other. As an example, consider a first video with a first sequence of video images, and a second video with the same first sequence of video images, and a video overlay. Clearly many video features (atoms, or elements) in the bag describing the first video will be similar to many video features in the bag describing the second video, and the "mutation" here is those vide features that are different because of the video overlay.

The gap penalty is a function accounting for the introduction of gaps between the nucleotides of a sequence. If a linear penalty is used, it is simply given as the number of gaps multiplied by some pre-set constant. More complicated gap penalties may take into consideration the probability of appearance of a gap, e.g. according to statistical distribution of advertisement positions and durations in the content.

Although the term "video DNA" gives a good descriptive overview of the described video signature method, it should be evident that matching the different video nucleotides can be more complex than matching biological nucleotides. A biological nucleotide is usually a simple "A", "T", "G", or "C", whereas a video DNA nucleotide is a more complex "bag of features" (bag of feature descriptors). Thus it is quite often the case that a given video nucleotide will never quite find a perfect match. Rather, the criterion for a "match" is usually going to be a close but not quite perfect match. Often, this match will be determined by a distance function, such as a distance, a L1 distance, the Mahalanobis distance, the Kullback-Leibler divergence distance, the Earth Mover's distance, or other function. That is, an example match is whenever video nucleotide "distance"<=threshold.

A smaller match criteria is considered to be a more stringent match (i.e. fewer video DNA nucleotides or signatures will match with each other), and a larger match criteria is considered to be a less stringent match (i.e. more video DNA nucleotides or signatures will match with each other).

Figure 26:
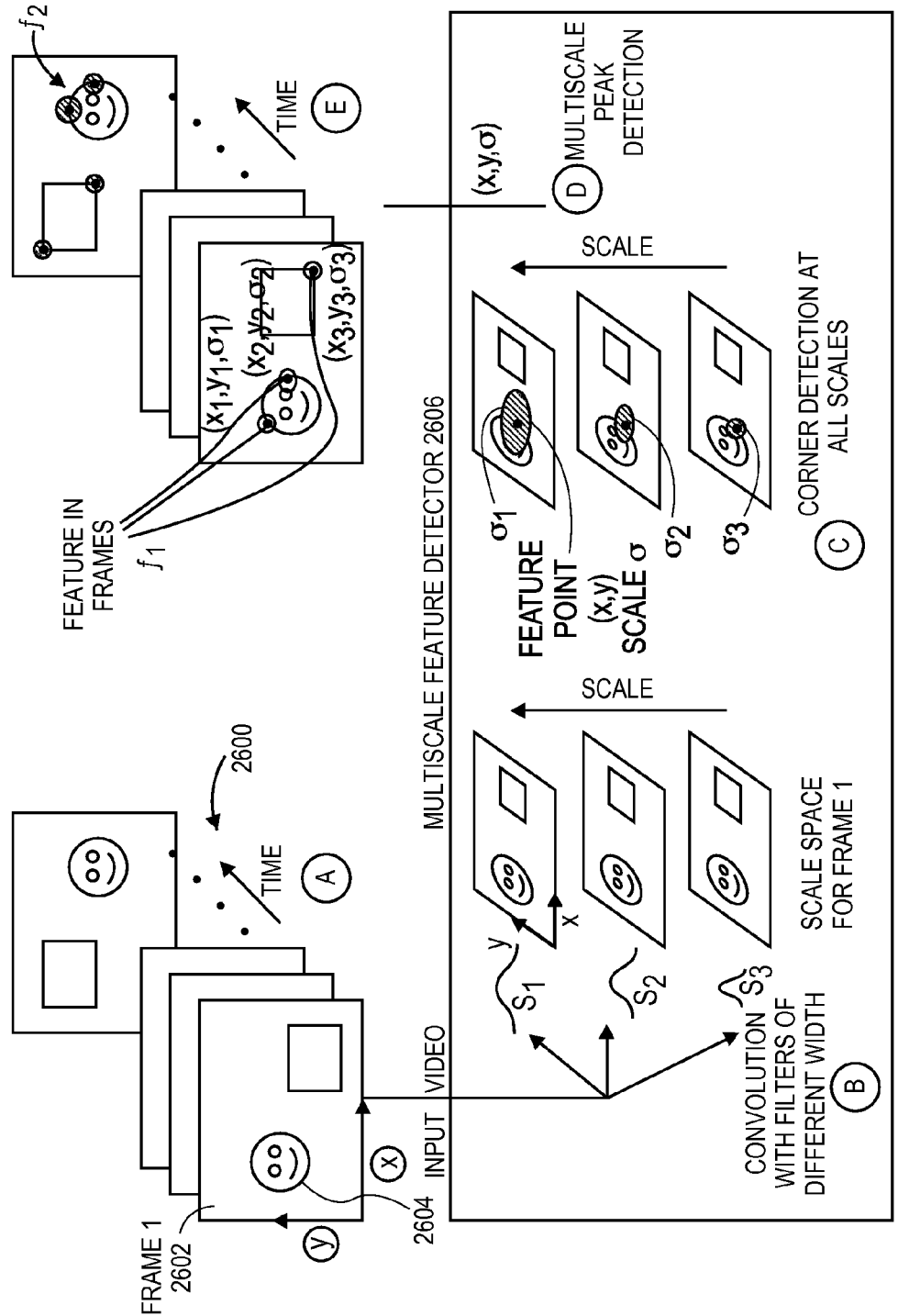
FIG. 26 illustrates an example of the video signature feature detection process.

Referring to FIGS. 26-30, a series of diagrams are shown to illustrate a process configured according to the systems and methods described herein. FIG. 26 illustrates an example of the video signature feature detection process. In this example, an input video (A) is composed of a series of various frames 2600 having a feature image 2604 and an area defined by x and y over a period of time is used as input into a multi-scale feature detector 2606. The video signals s1, s2, s3 are subjected to a convolution with filters of different spatial width (B), producing a series of images with different feature scales of resolution. These different scale space images are then analyzed (for example by corner detection), at the different scales 1,2,3 in (C). The picture can then be described by a series of multiscale peaks (D) where certain features f1, f2, in the frames (E) are identified.

Figure 27:
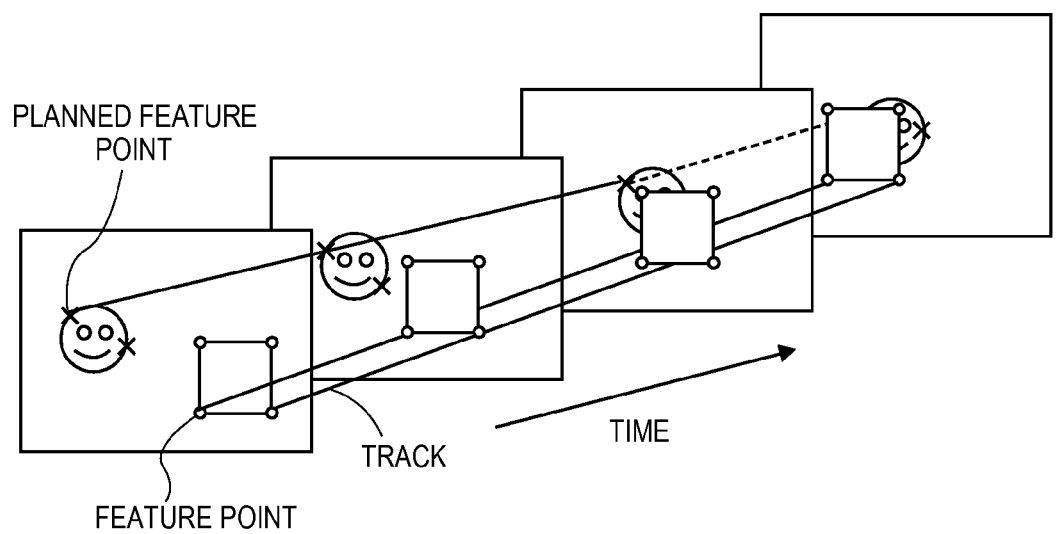
FIG. 27 shows an example of the video signature feature tracking and pruning process.

FIG. 27 shows an example of the video signature feature tracking and pruning process. This is an optional stage, but if it is used, features may be tracked over multiple frames and features that persist for enough (e.g., meet a preset criteria) frames are retained, while transient features that do not persist long enough to meet the criteria are rejected.

Figure 28:
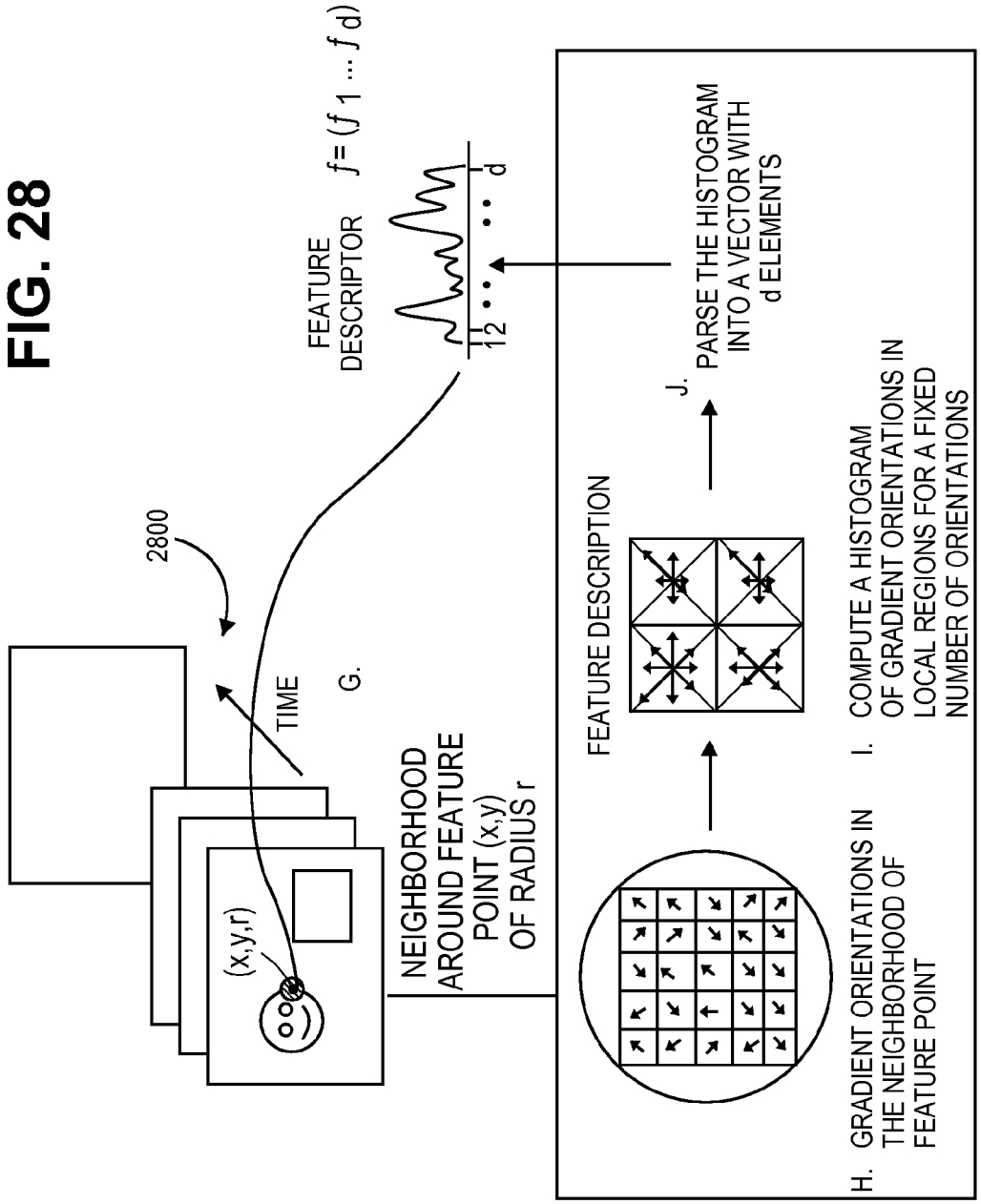
FIG. 28 shows an example of video signature feature description.

FIG. 28 shows an example of video signature feature description. The example of FIG. 28 illustrates how previously detected features can then be described. In general, the process works by again taking the input video 2800, and this time analyzing the video in the neighborhood (x, y, r) around each of the previously detected features (G). This feature description process can be done by a variety of different methods. In this example, a SIFT gradient of the image around the neighborhood of a feature point is computed (H), and from this gradient a histogram of gradient orientations in local regions for a fixed number of orientations is generated (I). This histogram is then parsed into a vector with elements (J), called a feature descriptor.

Figure 29:
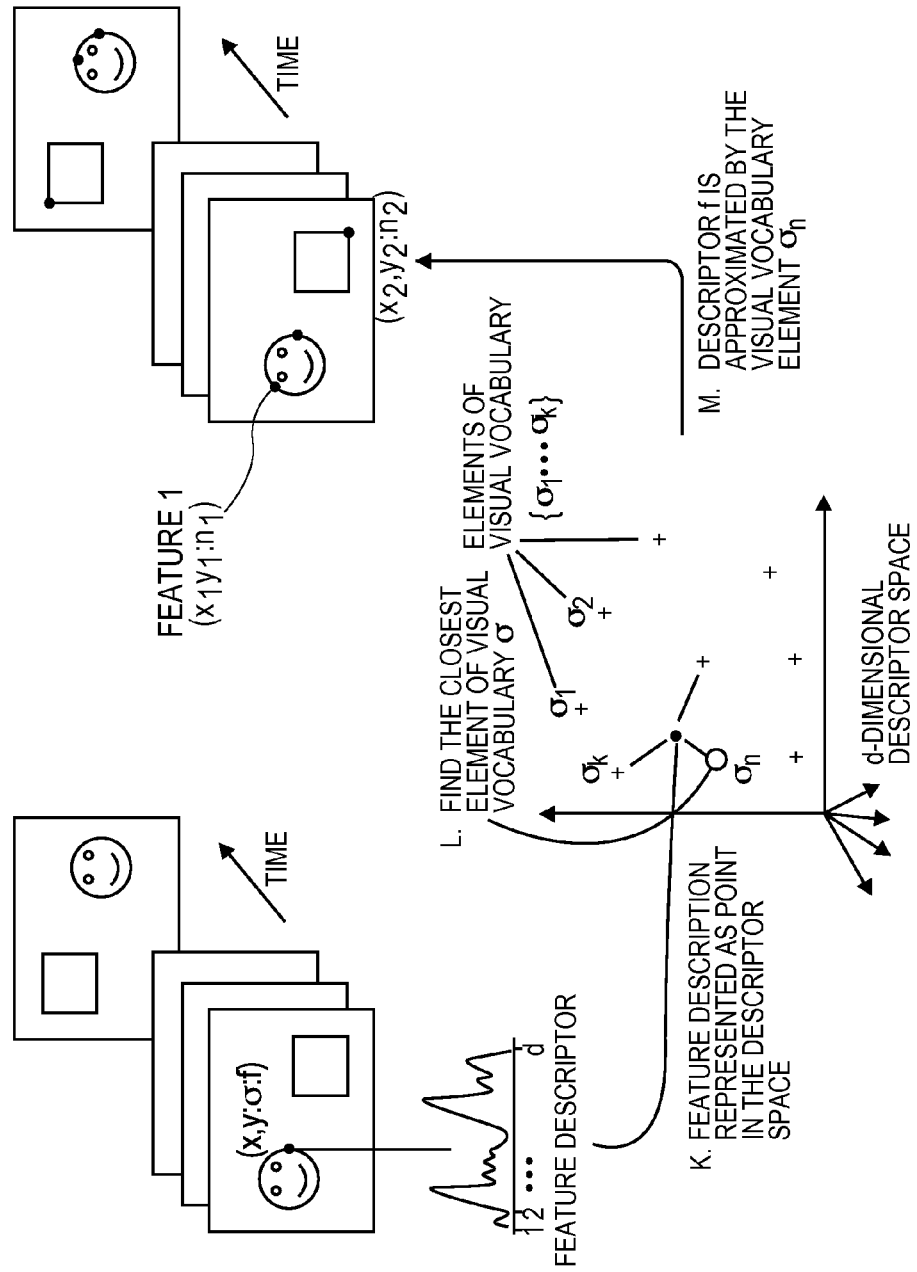
FIG. 29 shows an example of a vector quantization process.

FIG. 29 shows an example of a vector quantization process that maps an image into a series of quantized feature descriptors. In this example, the video image, previously described as a feature descriptor vector (K) with an arbitrary feature descriptor vocabulary, is mapped onto a standardized d-dimensional feature descriptor vocabulary (L). This use of a standardized descriptor vocabulary enables a standardized scheme (M) that is capable of uniquely identifying video, regardless of source.

Figure 30:
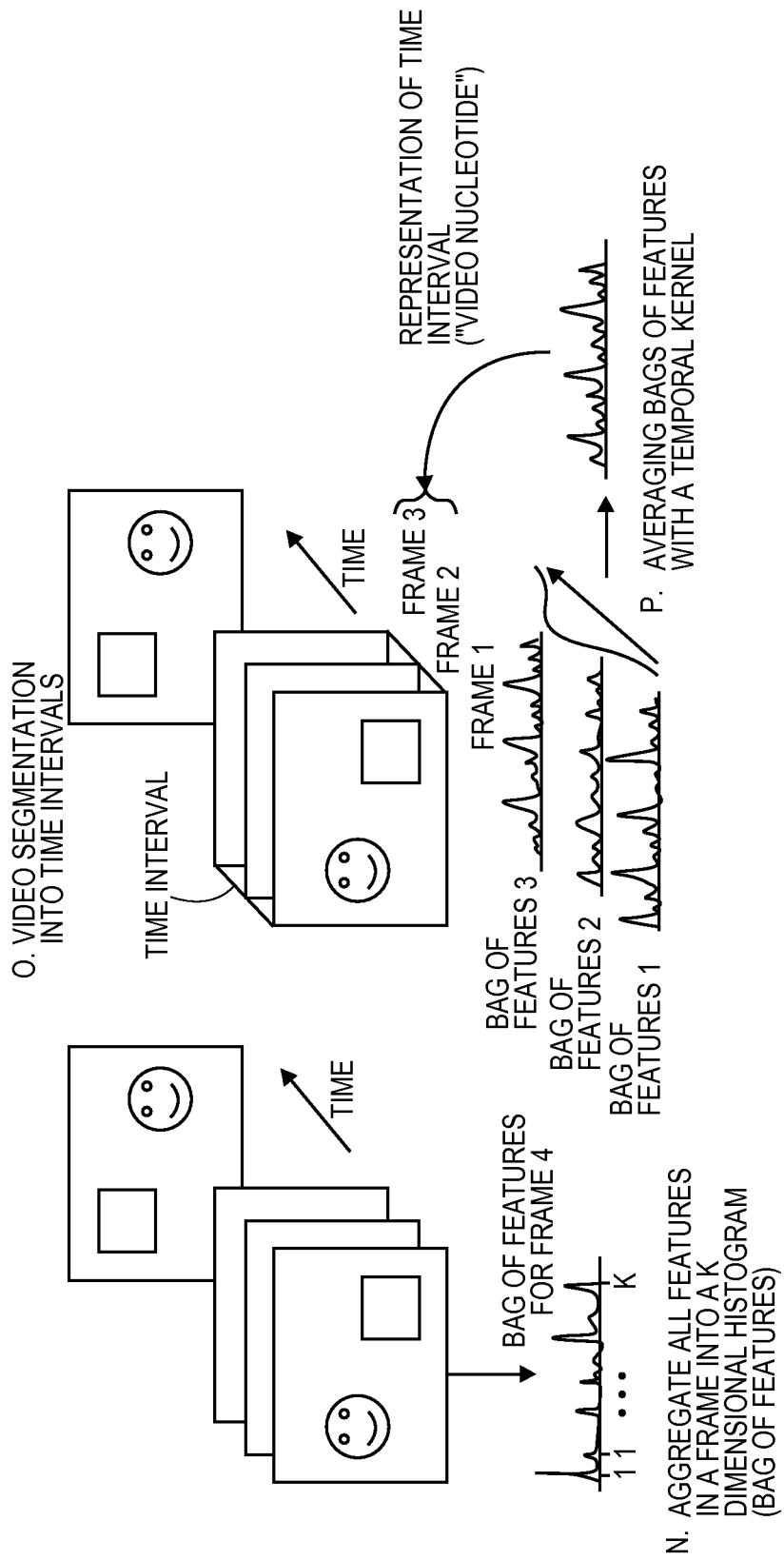
FIG. 30 shows an example of video DNA construction.

FIG. 30 shows an example of video DNA construction. In contrast to standard video analysis, which often analyzes video on a frame-by-frame basis, video DNA often combines or averages bags of features from multiple video frames to produce an overall "video nucleotide" for a time interval. An example of this is shown in FIG. 8. As previously discussed, the video data is analyzed and bags of features for particular frames are aggregated into k dimensional histograms or vectors (N). These bags of features from neighboring video frames (e.g., frame 1, frame 2, frame 3) are then averaged (P), producing a representation of a multi-frame video time interval, often referred to herein as a "video nucleotide".

Figure 31:
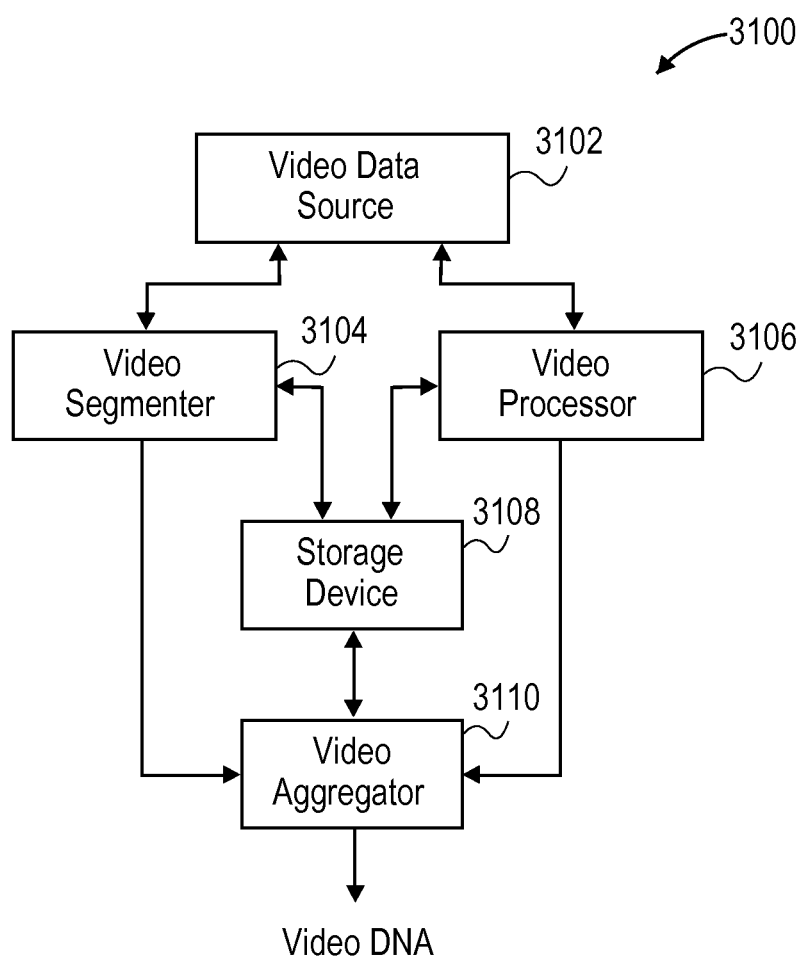
FIG. 31 shows an example system for processing video data as described herein.

FIG. 31 shows an example system 3100 for processing video data as described herein. A video data source 3102 stores and/or generates video data. A video segmenter 3104 receives video data from video data source 3102 and segments the video data into temporal intervals. A video processor 3106 receives video data from video data source 3102 and performs various operations on the received video data. In this example, video processor 3106 detects feature locations within the video data, generates feature descriptors associated with the feature locations, and prunes the detected feature locations to generate a subset of feature locations. A video aggregator 3110 is coupled to video segmenter 3104 and video processor 3106. Video aggregator 3110 generates a video DNA associated with the video data. As discussed herein, the video DNA can include video data ordered as sequences of visual nucleotides.

A storage device 3108 is coupled to video segmenter 3104, video processor 3106, and video aggregator 3110, and stores various data used by those components. The data stored includes, for example, video data, frame data, feature data, feature descriptors, visual atoms, video DNA, algorithms, settings, thresholds, and the like. The components illustrated in FIG. 31 may be directly coupled to one another and/or coupled to one another via one or more intermediate devices, systems, components, networks, communication links, and the like.

Embodiments of the systems and methods described herein facilitate selection and presentation of advertisements to users viewing displayed video data. Additionally, some embodiments may be used in conjunction with one or more conventional video processing and/or video display systems and methods. For example, one embodiment may be used as an improvement of existing video processing systems.

Although the components and modules illustrated herein are shown and described in a particular arrangement, the arrangement of components and modules may be altered to perform the selection and presentation of advertisements to users in a different manner. In other embodiments, one or more additional components or modules may be added to the described systems, and one or more components or modules may be removed from the described systems. Alternate embodiments may combine two or more of the described components or modules into a single component or module.

Although specific embodiments of the invention have been described and illustrated, the invention is not to be limited to the specific forms or arrangements of parts so described and illustrated. The scope of the invention is to be defined by the claims appended hereto and their equivalents.

The invention claimed is:

1. A method comprising:
   receiving video data on a device equipped with at least one computer processor;
   said video data comprising a plurality of 2D images without identified object content;
   identifying object content in the received video data by using said at least one processor and computer vision algorithms to analyze said video data into a three dimensional structure of features and associated objects;
   said three dimensional structure of video features and associated video objects comprising two spatial dimensions and one time dimension;
   separately receiving a plurality of objects that are associated with advertisements,
   wherein at least some of the objects that are associated with advertisements comprise objects that are similar to the associated video objects that are contained in said three dimensional structure;
   generating a video signal representing the video data;
   communicating the video signal to a display device, wherein the display device displays a video image;
   monitoring user interaction with the displayed video image by monitoring user selection of said associated video objects and/or user control of video playback; and
   using the plurality of received objects that are associated with advertisements, the monitored user interaction with the displayed video image, the video associated objects in the video data, and the similarity between the video associated objects in the video data and at least one object associated with advertisements to select an advertisement for display to the user.

2. The method of claim 1, wherein monitoring user interaction with the displayed video image includes monitoring user selection of an object in the displayed video image.

3. The method of claim 1, wherein monitoring user interaction with the displayed video image includes monitoring user control of playback of the displayed video image.

4. The method of claim 3, wherein the user control of playback includes pausing, fast forwarding, or rewinding playback of the displayed video image.

5. The method of claim 1, wherein selecting an advertisement for display includes offering the user an option to view the selected advertisement immediately.

6. The method of claim 5, further comprising deleting future advertisements associated with the video data if the user chooses to view the selected advertisement immediately.

7. The method of claim 1, wherein identifying object content in the received video data includes identifying an object position within the displayed video image.

8. The method of claim 1, wherein identifying object content in the received video data includes retrieving metadata associated with the video data, wherein the metadata identifies objects and associated object positions within the video data.

9. The method of claim 1, wherein said features comprise the coordinates of an image point of interest and a descriptor which describes the local image content or environment around said point of interest, said features and descriptors being chosen for their ability to persist when an image is rotated, presented with altered resolution, or presented with different lighting.

10. The method of claim 1, wherein said three dimensional structure comprises two spatial dimensions and one time dimension.

11. The method of claim 1, wherein user privacy is enhanced by further receiving and storing said plurality of objects that are associated with advertisements, and said advertisements, prior to monitoring user interaction with the displayed video image.

12. A method comprising:
   receiving video data on a device equipped with at least one computer processor;
   said video data comprising a plurality of 2D images without identified object content;
   using said at least one processor and computer vision algorithms to analyze said video data into a three dimensional structure of video features and associated video objects;

said three dimensional structure of video features and associated video objects comprising two spatial dimensions and one time dimension;

wherein said features comprise the coordinates of a video image point of interest and a descriptor which describes the local video image content or environment around said video point of interest, said features and descriptors being chosen for their ability to persist when a video image is rotated, presented with altered resolution, or presented with different lighting;

separately receiving a plurality of objects that are associated with advertisements, wherein at least some of the objects that are associated with advertisements comprise objects that are similar to the associated video objects that are contained in said three dimensional structure;

generating a video signal representing the video data;

communicating the video signal to a display device that displays a video image to a user;

monitoring user selection of an object displayed in the video image;

wherein if said user selects an object displayed in the video image, using the similarity between the user selected object and one more objects that are associated with advertisements to retrieve at least one advertisement associated with the selected object; and display the retrieved advertisement to the user.

13. The method of claim 12, further comprising replacing an original advertisement contained in the received video data with the retrieved advertisement.

14. The method of claim 12, wherein user privacy is enhanced by further receiving and storing said plurality of objects that are associated with advertisements, and said advertisements, prior to monitoring user interaction with the displayed video image.

15. A method comprising:

receiving video data and general advertisement video data on a video player device equipped with at least one computer processor;

said video data and general advertisement video data comprising a plurality of 2D images without identified object content;

storing the received video data and general advertisement video data;

using said at least one processor and computer vision algorithms to analyze said video data and general advertisement video data into a three dimensional structure of video features and general advertisement features and associated video objects and general advertisement objects;

said three dimensional structure of the video features and general advertisement features and associated video objects and general advertisement objects comprising two spatial dimensions and one time dimension;

retrieving viewer potential interest advertisement data likely to be of interest to a viewer of the received video data and general advertisement video data;

said viewer potential interest advertisement data comprising viewer potential interest advertisements associated with various video objects or general advertisement objects that are contained in said three dimensional structure;

storing the retrieved viewer potential interest advertisement data;

identifying at least one preference associated with the viewer of the received video data and general advertisement video data by monitoring user selection of said video data and general advertisement objects and/or user control of video playback or general advertisement video playback;

selecting an viewer potential interest advertisement from the retrieved viewer potential interest advertisement data based on the identified preference associated with the viewer of the received video data and general advertisement video data; and replacing one of the general advertisements contained in the received general advertisement video data with the selected viewer potential interest advertisement.

16. The method of claim 15, further comprising selecting additional viewer potential interest advertisements form the retrieved viewer potential interest advertisement data based on the identified preference associated with the viewer of the received video data and general advertisement video data, and replacing a plurality of the general advertisements contained in the received general advertisement video data with the selected additional viewer potential interest advertisements.

17. The method of claim 15, wherein identifying at least one preference associated with the viewer of the received video data and general advertisement video data includes monitoring the viewer's interaction with the received video data and general advertisement video data.

18. The method of claim 17, wherein selecting a viewer potential interest advertisement from the retrieved viewer potential interest advertisement data is further based on the viewer's interaction with the received video data and general advertisement video data.

19. The method of claim 17, wherein monitoring the viewer's interaction with the received video data and general advertisement video data includes monitoring the viewer's selection of an object in the received video data and general advertisement video data.

20. The method of claim 19, wherein monitoring the viewer's selection of an object in the received video data and general advertisement video data includes identifying an object position within a frame of the received video data and general advertisement video data.

21. The method of claim 17, wherein monitoring the viewer's interaction with the received video data and general advertisement video data includes monitoring the viewer's control of playback of the received video data and general advertisement video data.

22. The method of claim 15, wherein selecting a viewer potential interest advertisement from the retrieved viewer potential interest advertisement data is further based on received metadata associated with the received viewer potential interest video data.

23. The method of claim 15, wherein said features comprise the coordinates of an image point of interest and a descriptor which describes the local image content or environment around said point of interest, said features and descriptors being chosen for their ability to persist when an image is rotated, presented with altered resolution, or presented with different lighting.

24. The method of claim 15, wherein said three dimensional structure comprises two spatial dimensions and one time dimension.

* * * * *